(12) United States Patent
Kurane

(10) Patent No.: US 7,834,922 B2
(45) Date of Patent: Nov. 16, 2010

(54) IMAGE SENSING APPARATUS, IMAGE SENSING SYSTEM, AND IMAGE SENSING METHOD

(75) Inventor: Haruhisa Kurane, Shiojiri (JP)

(73) Assignee: Seiko Epson Corporation (JP)

( * ) Notice: Subject to any disclaimer, the term of this patent is extended or adjusted under 35 U.S.C. 154(b) by 839 days.

(21) Appl. No.: 11/690,986

(22) Filed: Mar. 26, 2007

(65) Prior Publication Data

US 2007/0222877 A1   Sep. 27, 2007

(30) Foreign Application Priority Data

Mar. 27, 2006 (JP) ............... 2006-084931
Jan. 25, 2007 (JP) ............... 2007-014722

(51) Int. Cl.
H04N 3/14 (2006.01)
H04N 5/335 (2006.01)

(52) U.S. Cl. .............. 348/294; 348/296; 348/301

(58) Field of Classification Search .......... 348/294–324
See application file for complete search history.

(56) References Cited

U.S. PATENT DOCUMENTS

| 5,541,654 A * | 7/1996 | Roberts ............... 348/301 |
| 7,365,779 B2 * | 4/2008 | Yamada ............... 348/230.1 |
| 7,408,572 B2 * | 8/2008 | Baxter et al. ........... 348/208.14 |
| 7,551,203 B2 * | 6/2009 | Nakayama et al. ....... 348/222.1 |
| 7,573,516 B2 * | 8/2009 | Krymski et al. ........... 348/296 |

FOREIGN PATENT DOCUMENTS

JP   07-078258   3/1995

* cited by examiner

*Primary Examiner*—Jason Chan
*Assistant Examiner*—Pritham Prabhakher
(74) *Attorney, Agent, or Firm*—Harness, Dickey & Pierce, P.L.C.

(57) ABSTRACT

There is provided an image sensing apparatus. The image sensing apparatus includes a photoelectric conversion unit constituted by a plurality of photoelectric conversion elements converting exposed light into charge and accumulating the charge therein, and an exposure time control function for controlling an exposure time of the photoelectric conversion elements, the apparatus including: a first readout unit that reads out charge from pixels composed of the photoelectric conversion elements of the photoelectric conversion unit, the charge being accumulated in the pixels as a result of exposure for a predetermined exposure time; a second readout unit that reads out charge from pixels of a specific area in a predetermined area of the photoelectric conversion unit over a plurality of times, in a period when the first readout unit is reading out charge from the pixels of the predetermined area of the photoelectric conversion unit; an image data generation unit that generates an image data on the basis of a first pixel data composed of the charge read out by the first readout unit; and a predetermined data generation unit that generates a predetermined data on the basis of a second pixel data composed of the charge read over the plurality of times by the second readout unit.

11 Claims, 13 Drawing Sheets

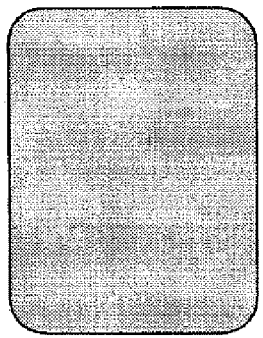
FIG.13E
PRESENT FRAME'S DETECTION IMAGE DATA
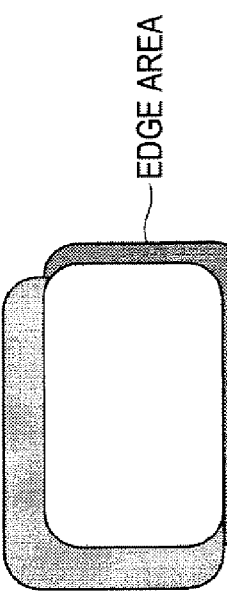
FIG.13C
INTERFRAME DIFFERENCE IMAGE DATA (EDGE DETECTION IMAGE BASED ON MOVEMENT)
EDGE AREA
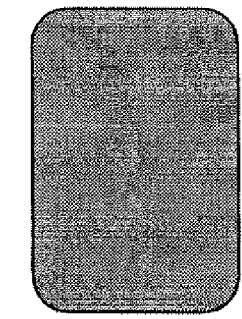
FIG.13D
PREVIOUS FRAME'S DETECTION IMAGE DATA
FIG.13A
TARGET OBJECT
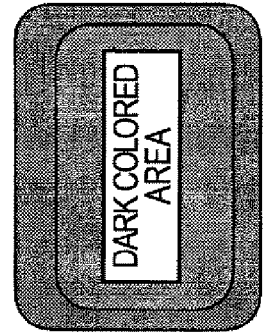
FIG.13B
ESTIMATE TARGET OBJECT'S SHAPE FROM EDGE IMAGE
DARK COLORED AREA

IMAGE SENSING APPARATUS, IMAGE SENSING SYSTEM, AND IMAGE SENSING METHOD

BACKGROUND

1. Technical Field

The present invention relates to an image sensing apparatus capable of reading out charge from a photoelectric conversion element using both destructive and non-destructive readout modes.

2. Related Art

Recently, a monitoring camera mounted on a mobile object is attracting attention. For example, there is known a monitoring camera, known as an on-vehicle camera, which is mounted on a vehicle. The on-vehicle camera may be used in detecting a centerline or guardrail on a road or rail, an inter-vehicle distance to a preceding or following vehicle, and an abrupt change in contrast at the entrance to a tunnel. The recognition or detection result is output to a control unit of a predetermined control object (for example, brakes, steering, or alarm systems), and the control unit controls the control object on the basis of the detection result and takes measures against unforeseen changes in situation or accidents that may be caused by a person's carelessness.

The on-vehicle camera may also be used in detecting the entire states of a photographic object that cannot be caught with human eyes' capability and thus enabling a high-speed control of the control object based on the detection result.

The high-speed control can find its application in a vehicle moving at a high speed, for example, in high-speed detection of turning on and off of a preceding vehicle's brake lamp and thus (automatically) braking of the vehicle or in (automatically) avoiding dangerous objects flying or rushing into the vehicle. In a mobile object such as the vehicle moving at a high speed, it is desirable to immediately catch (detect) instantaneous changes in state so as to automatically actuate a corresponding mechanism to allow for braking of the vehicle or avoid any possible accident. It is also desirable to stably keep track of other vehicles moving in its forward or side areas and thus enable to predict the movement of a target object and inform the vehicle's driver using a warning signal.

In the related art, there is known a camera for use in factory automation (FA). In such a camera, there is used a technique in which an interframe difference image (background) is taken and a change in the difference image is detected. However, since the background image sensed by the on-vehicle camera cannot be specified and is likely to change with time, it is difficult to use the technique in the high-speed control.

By the way, a recently developed low-cost and high-speed camera has made the high-speed and stable control possible and thus applied in the field of robot vision. The camera can sense images at a frame rate of $1/1000$, for example. In a high-frame rate video, there is little movement of the photographic object in one frame, a frame has a high correlation with a preceding or subsequent frame, and the target object (an areal image) in the photographic object shows a small amount of movement. Therefore, the level of pixels corresponding to the frame difference image becomes small. Moreover, it is possible to detect edges on the target object's areal image of the frame difference image caused by the movement (since the width of the edge portion in the difference image becomes small). In addition, it is possible to detect the movement (relative movement) of the target object with improved precision. Accordingly, it allows a device having the camera mounted thereon to immediately detect the target object and the change (movement) in the target object with good precision. That is, with the difference processing of the high frame rate video, it is possible to detect edges with easy and high precision and thus easily estimate the shape of the target object. In addition, it is possible to estimate the change in the shape of the target object in a reduced cycle. Since this application is directed to control of a camera, the coordinate (position) information and shape on the target object serve as an important factor, but matters such a gradation level or a wide-angle image are not crucial to the application (because it only needs to detect an areal image of the target object at a high speed, accurately detect an edge portion, and recognize the shape of the target object).

As an object of the on-vehicle camera, as described above, the camera aims to detect the centerline, the inter-vehicle distance to a preceding vehicle and the like. For this detection, an image needs to have a high contrast and a greater degree of signal-to-noise (S/N) ratio. In addition, video images recorded by a drive recorder before and after an accident need to have sufficient visibility and thus require a sufficient exposure time. That is, it is anticipated to acquire the entire images with a wide angle and a good gradation level (in order to acquire a clear image).

In the end, the on-vehicle camera requires a high visibility (S/N) as well as a high speed for use in a machine vision.

As a known technology for recognizing an object moving in a forward or side areas of a vehicle on the basis of images sensed by the on-vehicle camera, there is known an object recognition apparatus as disclosed in JP-A-7-078258, for example.

The known technology disclosed in JP-A-7-078258 can recognize a predetermined kind of object from objects displayed on a screen of the images sensed by the on-vehicle camera. More specifically, an area on which an object for recognition is supposed to be present is cut off from the screen, and images in the cut-off area are subjected to a recognition process, thereby improving processing efficiency.

However, in the known technology disclosed in JP-A-7-078258, it can be seen from the detailed description of embodiments that the sensed image for use in the recognition needs to have some degree of visibility. That is, since the photographic object is sensed at a frame rate (exposure time) providing a sufficient exposure time, it may be difficult for the on-vehicle camera to acquire a high frame-rate image for use in a high-speed control. Thus, in order to implement the high-speed control in the known technology, there is a need to use two cameras, one for the high-speed control and the other for the visibility. Since the use of two cameras may cause a problem of increasing costs or power consumption, it is desirable to implement with a single camera. However, when an image is acquired at a high speed in the single camera implementation for a stable control, the acquired image may have a poor S/N characteristic due to an insufficient exposure time and it is thus impossible to acquire an image having a quality for use in other purposes.

SUMMARY

An advantage of an aspect of the invention is that it provides an image sensing apparatus capable of acquiring, with a single image sensing element, a high frame-rate image having a relatively high frame rate enabling to detect a target object having a relatively high moving speed and extract the shape of the target object as well as a normal image having a relative low frame rate providing an image quality that can be perceived by a human, and generating a control data for use in controlling a control object requiring a relatively high control speed (response speed or detection speed) on the basis of the high frame-rate image.

Aspect 1

According to Aspect 1 of an image sensing apparatus, there is provided an image sensing apparatus including a photoelectric conversion unit constituted by a plurality of photoelectric conversion elements converting exposed light into charge and accumulating the charge therein, and an exposure time control function for controlling an exposure time of the photoelectric conversion elements, the apparatus including: a first readout unit that reads out charge from pixels composed of the photoelectric conversion elements of the photoelectric conversion unit, the charge being accumulated in the pixels as a result of exposure for a predetermined exposure time; a second readout unit that reads out charge from pixels of a specific area in a predetermined area of the photoelectric conversion unit over a plurality of times, in a period when the first readout unit is reading out charge from the pixels of the predetermined area of the photoelectric conversion unit; an image data generation unit that generates an image data on the basis of a first pixel data composed of the charge read out by the first readout unit; and a predetermined data generation unit that generates a predetermined data on the basis of a second pixel data composed of the charge read over the plurality of times by the second readout unit.

With this arrangement, the first readout unit allows to read out charge from pixels composed of the photoelectric conversion elements of the photoelectric conversion unit, the charge being accumulated in the pixels as a result of exposure for a predetermined exposure time; and the second readout unit allows to read out charge from pixels of a specific area in a predetermined area of the photoelectric conversion unit over a plurality of times, in a period when the first readout unit is reading out charge from the pixels of the predetermined area of the photoelectric conversion unit.

Moreover, the image data generation unit allows to generate an image data on the basis of a first pixel data composed of the charge read out by the first readout unit; and the predetermined data generation unit allows to generate a predetermined data on the basis of a second pixel data composed of the charge read over the plurality of times by the second readout unit.

Therefore, when the invention is applied to a mobile object moving at a high speed and is used to sense an image of a sensing object constituted by a target photographic object moving in a forward area of the mobile object and a background image of the target photographic object, the first readout unit exposes pixels on the entire exposure area to light for a long exposure time, for example, having a sufficient duration for obtaining a sensing image providing visibility of the entire content of the sensing result and reads out charge from the pixels on the entire exposure area. Accordingly, it is possible to obtain data for the sensing object image (entire image) having exposed for a long exposure time.

In the course of the exposure having the long exposure time, those pixels corresponding to a specific area that is defined as a peripheral area including the area on which the target photographic object has moved are sequentially exposed to light with a plurality kinds (for example, five) of exposure times, for example, having a duration shorter than the long exposure time, and charge is sequentially read out from the pixels using a non-destructive readout mode. Accordingly, it is possible to obtain an image data for the specific area having exposed with the plurality kinds of exposure times at a frame rate higher than that for the long exposure time.

In this way, since the image data can be generated from the respective pixel data composed of the charge having exposed for the long exposure time, it is possible to obtain the sensing image (image corresponding to the entire exposure area) having exposed for an exposure time providing sufficient visibility. Moreover, since a predetermined data can be generated on the basis of the respective pixel data composed of the charge acquired with the high frame rate, it is possible to generate a control data for allowing a drive unit (a braking system or a steering system) of the mobile object to detect an abrupt change such as an abrupt approach of a target photographic object and keep track of the change at a high speed.

Since an abrupt change in the pixel data of the specific area can be monitored, it is possible to constantly monitor a specific target photographic object and generate a control data immediately in response to a change (for example, an abrupt change in a luminance level due to radiation of a passing light, approaching of a flying object, an object traveling in a forward area at a high speed, an obstacle encountered when passing the top of a slope) in an areal image suddenly generated (sensed) within a specific area.

In the invention, the "photoelectric conversion unit" may be configured by employing a CMOS technology, and an example of an image sensing element capable of a non-destructive readout operation and employing the CMOS technology includes a threshold value modulation-type image sensor (for example, VMIS: Threshold Voltage Modulation Image Sensor). The above statement can be similarly applied to aspects related to the image sensing apparatus, aspects related to the image sensing system, and aspects related to the image sensing method.

The "control object" may differ depending on where the image sensing apparatus of the invention is applied: i.e., when used for monitoring a danger of a mobile object such as a vehicle or a ship, the control object may be a braking system, a steering system, a driving system (an engine or a motor), or an alarm system; when used for controlling an image sensing posture of an image sensing apparatus, the control object may be a device for controlling the posture; or when used for monitoring a building intruder (thief) or an illegal ATM user, the control object may be a device for notifying the intrusion. The above statement can be similarly applied to aspects related to the image sensing apparatus, aspects related to the image sensing system, and aspects related to the image sensing method.

Aspect 2

According to Aspect 2 of an image sensing apparatus, there is provided an image sensing apparatus including a photoelectric conversion unit constituted by a plurality of photoelectric conversion elements converting exposed light into charge and accumulating the charge therein, the photoelectric conversion elements being arranged in a matrix, and an electronic shutter function for controlling an exposure time, the apparatus including: a first readout unit that reads out charge from pixels composed of the photoelectric conversion elements of the photoelectric conversion unit using a destructive readout mode, the charge being accumulated in the pixels as a result of exposure for a predetermined exposure time; a second readout unit that reads out charge from pixels composed of the photoelectric conversion elements corresponding to a specific area in an entire exposure area of the photoelectric conversion unit over a plurality of times using a non-destructive readout mode, in a period when the first readout unit is reading out charge for one frame from the entire exposure area of the photoelectric conversion unit; an image data generation unit that generates an image data on the basis of a first pixel data composed of the charge read out by the first readout unit, the charge being obtained by exposing the entire exposure area to light for the predetermined exposure time; a control data generation unit that generates a control data on the basis of a second pixel data composed of the charge read out by the second readout unit, the charge being obtained by exposing the specific area to light with different exposure times; and a control data output unit that outputs the control data.

With this arrangement, the first readout unit allows to read out charge from pixels composed of the photoelectric conversion elements of the photoelectric conversion unit using a destructive readout mode, the charge being accumulated in the pixels as a result of exposure for a predetermined exposure time; and the second readout unit allows to read out charge from pixels composed of the photoelectric conversion elements corresponding to a specific area in an entire exposure area of the photoelectric conversion unit over a plurality of times using a non-destructive readout mode, in a period when the first readout unit is reading out charge for one frame from the entire exposure area of the photoelectric conversion unit.

Moreover, the image data generation unit allows to generate an image data on the basis of a first pixel data composed of the charge read out by the first readout unit, the charge being obtained by exposing the entire exposure area to light for the predetermined exposure time; the control data generation unit allows to generate a control data on the basis of a second pixel data composed of the charge read out by the second readout unit, the charge being obtained by exposing the specific area to light with different exposure times; and the control data output unit allows to output the control data.

Therefore, similar to the case of Aspect 1, when the invention is applied to a mobile object moving at a high speed and is used to sense an image of a sensing object constituted by a target photographic object moving in a forward area of the mobile object and a background image of the target photographic object, the image data can be generated from the respective pixel data composed of the charge having exposed for the long exposure time. Accordingly, it is possible to obtain the sensing image (image corresponding to the entire exposure area) having exposed for an exposure time providing sufficient visibility.

Moreover, it is possible to generate a control data on the basis of the pixel data composed of charge that is acquired from the specific area having exposed with the plurality kinds of exposure times at a frame rate higher than that for the long exposure time, in the course of the exposure having the long exposure time.

In this way, it is possible to generate a control data for allowing a control object such as a drive unit (a braking system or a steering system) of a mobile object to detect an abrupt change such as an abrupt approach of a target photographic object and keep track of the change at a high speed.

Since an abrupt change in the pixel data of the specific area can be monitored, it is possible to constantly monitor a specific target photographic object and generate a control data immediately in response to a change (for example, an abrupt change in a luminance level due to radiation of a passing light, approaching of a flying object, an object traveling in a forward area at a high speed, an obstacle encountered when passing the top of a slope) in an areal image suddenly generated (sensed) within a specific area.

In the invention, the "destructive readout mode" refers to a mode in which a reset operation for clearing charge accumulated in a photoelectric conversion element is performed after the charge (a pixel signal) is read out from the photoelectric conversion element. The above statement can be similarly applied to aspects related to the image sensing system, and aspects related to the image sensing method.

The "non-destructive readout mode" refers to a mode in which charge accumulated in a photoelectric conversion element is maintained after the charge (a pixel signal) is read out from the photoelectric conversion element. That is, since the reset operation is not performed at the time of reading out the charge, the charge may be read out with respect to the different exposure times many times in the course of the charge accumulation until reaching the set exposure time. The above statement can be similarly applied to aspects related to the image sensing apparatus, aspects related to the image sensing system, and aspects related to the image sensing method.

The "control data" may be the pixel data itself corresponding to the readout charge, other data (for example, noise-removed data or a difference value) obtained by processing the readout pixel data, information extractable or recognizable on the basis of the readout pixel data, or data corresponding to a determination result made on the basis of the information. The above statement can be similarly applied to aspects related to the image sensing apparatus, aspects related to the image sensing system, and aspects related to the image sensing method.

Aspect 3

According to Aspect 3 of an image sensing apparatus, there is provided an image sensing apparatus including a photoelectric conversion unit constituted by a plurality of photoelectric conversion elements converting exposed light into charge and accumulating the charge therein, the photoelectric conversion elements being arranged in a matrix, and an electronic shutter function for controlling an exposure time for each frame, the apparatus including: a first readout unit that reads out charge from pixels composed of the photoelectric conversion elements corresponding to an entire exposure area of the photoelectric conversion unit using a destructive readout mode, the charge being accumulated in the pixels as a result of exposure for a predetermined exposure time, the entire exposure area being an entire area of the photoelectric conversion unit to which light can be exposed, the destructive readout mode being configured such that a reset operation for clearing the charge accumulated in the pixels is performed after the charge is read out from the pixels; a second readout unit that reads out charge from pixels composed of the photoelectric conversion elements corresponding to a specific area in the entire exposure area of the photoelectric conversion unit using a non-destructive readout mode, in a period when the first readout unit is reading out charge from the entire exposure area, the charge read out by the second readout unit being the charge accumulated in the pixels composed of the photoelectric conversion elements corresponding to the specific area, the non-destructive readout mode being configured such that the charge accumulated in the pixels is maintained after the charge is read out from the pixels; an image data generation unit that generates an image data on the basis of a first pixel data composed of the charge read out by the first readout unit, the charge being obtained by exposing the entire exposure area to light for the predetermined exposure time; a control data generation unit that generates a control data for use in controlling a predetermined control object on the basis of a second pixel data composed of the charge read out by the second readout unit, the charge being obtained by exposing the specific area to light with a plurality kinds of exposure times; and a control data output unit that outputs the control data generated by the control data generation unit.

With this arrangement, the first readout unit allows to read out charge from pixels composed of the photoelectric conversion elements corresponding to an entire exposure area of the photoelectric conversion unit using a destructive readout mode, the charge being accumulated in the pixels as a result of exposure for a predetermined exposure time, the entire exposure area being an entire area of the photoelectric conversion unit to which light can be exposed, the destructive readout mode being configured such that a reset operation for clearing the charge accumulated in the pixels is performed after the charge is read out from the pixels; and the second readout unit allows to read out charge from pixels composed of the photoelectric conversion elements corresponding to a specific area in the entire exposure area of the photoelectric conversion unit using a non-destructive readout mode, in a period when the first readout unit is reading out charge from the entire exposure area, the charge read out by the second readout unit being the charge accumulated in the pixels composed of the photoelectric conversion elements corresponding to the specific area, the non-destructive readout mode being configured such that the charge accumulated in the pixels is maintained after the charge is read out from the pixels.

Moreover, the image data generation unit allows to generate an image data on the basis of a first pixel data composed of the charge read out by the first readout unit, the charge being obtained by exposing the entire exposure area to light for the predetermined exposure time; the control data generation unit allows to generate a control data for use in controlling a predetermined control object on the basis of a second pixel data composed of the charge read out by the second readout unit, the charge being obtained by exposing the specific area to light with a plurality kinds of exposure times; and the control data output unit allows to output the control data generated by the control data generation unit.

Therefore, similar to the case of Aspect 1, when the invention is applied to a mobile object moving at a high speed and is used to sense an image of a sensing object constituted by a target photographic object moving in a forward area of the mobile object and a background image of the target photographic object, the image data can be generated from the respective pixel data composed of the charge having exposed for the long exposure time. Accordingly, it is possible to obtain the sensing image (image corresponding to the entire exposure area) having exposed for an exposure time providing sufficient visibility.

Moreover, it is possible to generate a control data on the basis of the pixel data composed of charge that is acquired from the specific area having exposed with the plurality kinds of exposure times at a frame rate higher than that for the long exposure time, in the course of the exposure having the long exposure time.

In this way, it is possible to generate a control data for allowing a control object such as a drive unit (a braking system or a steering system) of a mobile object to detect an abrupt change such as an abrupt approach of a target photographic object and keep track of the change at a high speed.

Since an abrupt change in the pixel data of the specific area can be monitored, it is possible to constantly monitor a specific target photographic object and generate a control data immediately in response to a change (for example, an abrupt change in a luminance level due to radiation of a passing light, approaching of a flying object, an object traveling in a forward area at a high speed, an obstacle encountered when passing the top of a slope) in an areal image suddenly generated (sensed) within a specific area.

Aspect 4

An image sensing apparatus according to Aspect 4 is the image sensing apparatus according to Aspect 2 or 3, wherein the control data generation unit includes a first difference value calculation unit for calculating, for each frame, a first difference value that is a difference between respective pixel values for two of the second pixel data having the same pixel position and different exposure time, among the second pixel data having the plurality kinds of exposure times and obtained through the plurality times of readout operations, and generates the control data on the basis of the first difference value calculated by the first difference value calculation unit.

With this arrangement, a pixel data having read out in an exposure time immediately before the exposure in which charge is being read out in a non-destructive readout mode is maintained as a reference data, and a difference value (a first difference value) is calculated by subtracting the reference data from the presently readout pixel data. Accordingly, it is possible to generate a control data on the basis of the first difference value.

Since a change in a luminance level of the target photographic object can be known from the first difference value, various kinds of information on the target photographic object such as a position or a detailed action of the target photographic object, the target photographic object's plunging into a specific area, or an abrupt change in the luminance level of the entire specific areal image (for example, an abrupt appearing of glaring scene) can be known from the change in the luminance level. That is, since a control data for allowing a more suitable control over a predetermined control object can be generated from the information, it is possible to generate the control data for allowing a more suitable control over the control object.

Moreover, since the photoelectric conversion elements (pixels) constituting the photoelectric conversion unit may generate fixed pattern noise resulting from their irregular characteristics, much noise components are likely to be mixed into the pixel data composed of the charge read out in the non-destructive readout mode. That is, since the noise components mixed into the pixel data can be removed by calculating the difference value, it is possible to estimate various kinds of information on the target photographic object on the basis of a more exactly calculated change in the luminance level.

In the invention, the "fixed pattern noise" refers to noise resulting from dark current shading associated with a long exposure time or different sensor sensitivity in each pixel. The above statement can be similarly applied to aspects related to the image sensing system, and aspects related to the image sensing method.

Aspect 5

An image sensing apparatus according to Aspect 5 is the image sensing apparatus according to Aspect 4, wherein the control data generation unit includes: a present specific areal image data generation unit for generating a present specific areal image data on the basis of the first difference value for a present frame calculated by the first difference value calculation unit, a previous specific areal image data generation unit for generating a previous specific areal image data on the basis of the first difference value for a previous frame calculated by the first difference value calculation unit, the previous frame being previous to the frame of the present specific areal image data; and a second difference value calculation unit for calculating a second difference value that is a difference between the respective pixel values for the pixel data of the present specific areal image data and the pixel data of the previous specific areal image data, and wherein the control data generation unit generates the control data on the basis of the second difference value calculated by the second difference value calculation unit.

With this arrangement, it is possible to generate a control data on the basis of a difference image obtained between an image data for a present frame and an image data for a previous frame (i.e., on the basis of interframe difference image (an image composed of a second difference value)).

Therefore, since various kinds of information on the target photographic object such as a position or shape of the target photographic object can be known from a change in the luminance level between frames of the target photographic object, it is possible to generate the control data for allowing a more suitable control over the control object.

Aspect 6

An image sensing apparatus according to Aspect 6 is the image sensing apparatus according to Aspect 5, wherein the control data generation unit includes a filter processing unit for performing a filtering process to the present specific areal image data and the previous specific areal image data using a 2-dimensional low-pass filter, and wherein the control data generation unit calculates, as the second difference data, a difference value between the respective pixel values for the pixel data of the present specific areal image data and the pixel data of the previous specific areal image data which have been subjected to the filtering process by the second difference value calculation unit, and generates the control data on the bases of the second difference value calculated by the second difference value calculation unit.

With this arrangement, since a two-dimensional low-pass filter (hereinafter, referred to as 2D LPF) such as a linear low-pass filter can remove a negligible change in a screen such as shallow raised or grooved stripes (for example, small stones on a road surface) in an image on a specific area (hereinafter, referred to as specific areal image), it is possible to obtain more accurate information necessary for avoiding a danger. Accordingly, it is possible to generate a control data for allowing a more suitable control over the control object.

Aspect 7

An image sensing apparatus according to Aspect 7 is the image sensing apparatus according to any one of Aspects 4 to 6, wherein the control data generation unit generates data for notifying a control unit of the predetermined control object of a fact that the number of pixels having a luminance value equal to or greater than a specific value as indicated by the second difference value has reached a predetermined number or more.

In this arrangement, the image sensing apparatus of the aspect of the invention may be mounted on a vehicle and used to sense an image of a preceding vehicle as a target photographic object. In this case, when the preceding vehicle (the target photographic object) is not present in the specific area or the vehicle having the image sensing apparatus mounted thereon is traveling with a normal inter-vehicle distance to the preceding vehicle, the second difference value (corresponding to the amount of a change in the luminance level) of the specific areal image has a relatively small value. Meanwhile, since the luminance level of the image of the target photographic object may increase due to turning on of the preceding vehicle's the brake lamp at the time of braking, the second difference value may increase and thus the number of pixels for which the second difference value is equal to or greater than a specific value may also increase. In this respect, it is possible to easily detect a dangerous situation such as an abrupt braking of the preceding vehicle from the second difference value (a change in the luminance level) and generate a control data (for example, an alarm data for informing abnormality detection) for notifying a control unit of the detection.

That is, since it is possible to immediately notify the control unit of approaching of a danger (or, data for determining the danger) by immediately transmitting the generated control data to the control unit, it is possible to allow the control unit to perform a high-speed control to the control object.

Aspect 8

An image sensing apparatus according to Aspect 8 is the image sensing apparatus according to any one of Aspects 4 to 7, wherein the control data generation unit includes an estimation unit for estimating information on a predetermined photographic object sensed from the specific area on the basis of the second pixel data having the plurality kinds of exposure times, and generates the control data on the basis of the estimation result in the estimation unit.

With this arrangement, it is possible to estimate information on the target photographic object in the specific area and generate a control data on the basis of the estimation result. Therefore, it is possible to estimate a movement of the target photographic object from a change in the luminance level of the target photographic object image and generate, on the basis of the estimation result, the control data such as data indicating a detailed action such as approaching of the target photographic object or an alarm data indicating a danger. Accordingly, it is possible to immediately estimate a detailed status of the target photographic object and to generate a control data for allowing a more suitable control over the target photographic object.

Aspect 9

An image sensing apparatus according to Aspect 9 is the image sensing apparatus according to Aspect 8, wherein the control data generation unit includes an edge information extraction unit for extracting edge information from a difference image data in which the first difference value is composed of pixel data corresponding to respective pixels of the specific area, and wherein the estimation unit estimates the shape of the predetermined photographic object on the basis of the edge information extracted by the edge information extraction unit.

With this arrangement, since edge information of the difference image can be extracted from within the specific area, it is possible to estimate the shape of the target photographic object from the edge information. Accordingly, it is possible to estimate various kinds of information on the target photographic object, such as an estimation of the exact position of the target photographic object from the shape information, or an estimation of the exact action of the target photographic object from a change in the shape that can be known from the shape information.

In the invention, the "edge information" refers to information indicating a change in the luminance level of areas of an image where the luminance level changes abruptly. For example, the luminance level may change abruptly in a boundary of the specific area between the target photographic object image and its background image. The image constituted by the edge information forms a border of the target photographic object image. The edge information (a value of the luminance level change) may be calculated using a differential operation. The differential operation includes a gradient (1st order differential) and Laplacian (2nd order differential). However, when the edge information is extracted from a digital image, the digital image is not continuous and thus, strictly speaking, the differential operation cannot be performed. Therefore, it is necessary to calculate an approximate value of the differential value between adjacent pixels through a difference operation. A difference value between adjacent pixels may be calculated by applying a weight value to the pixel using a differential parameter. The difference value corresponds to the approximated value for the differential value between the adjacent pixels.

Aspect 10

An image sensing apparatus according to Aspect 10 is the image sensing apparatus according to Aspect 8 or 9, wherein the edge information extraction unit extracts edge information from the image data as well as a difference image data in which the first difference value is composed of pixel data corresponding to respective pixels of the specific area, and wherein the estimation unit estimates the shape of the predetermined photographic object on the basis of the edge information extracted by the edge information extraction unit.

With this arrangement, it is possible to estimate the shape of the target photographic object from the edge information of an image providing visibility of the exact content of the sensing image and the edge information of the difference image obtained through high-speed sampling. Accordingly, it is possible to estimate the shape of the target photographic object more exactly.

Aspect 11

An image sensing apparatus according to Aspect 11 is the image sensing apparatus according to Aspect 9 or 10, wherein the control data generation unit generates data for notifying a control unit of the predetermined control object of a fact that the amount of change in the shape of the predetermined photographic object as indicated by the shape estimation result of the photographic object has reached a value equal to or greater than a predetermined value or less than the predetermined value.

In this arrangement, the image sensing apparatus of the aspect of the invention may be mounted on a vehicle and used to sense an image of a preceding vehicle as a target photographic object. In this case, when the amount of a change in the shape of the target photographic object becomes a specific value or more in a direction where the size of the target photographic object increases, the target photographic object is more likely to be positioned close to the image sensing apparatus. Accordingly, it is possible to generate a control data (for example, an alarm data for informing abnormality detection) for notifying a control unit of the effect.

That is, since it is possible to immediately notify the control unit of approaching of a danger (or, data for determining the danger) by immediately transmitting the generated control data to the control unit, it is possible to allow the control unit to perform a high-speed control to the control object.

Aspect 12

An image sensing apparatus according to Aspect 12 is the image sensing apparatus according to any one of Aspects 1 to 11, wherein the apparatus further includes a specific area width setting unit for setting the width of the specific area on the basis of speed information of a mobile object on which the image sensing apparatus is mounted.

With this arrangement, it is possible to set the width of the specific area on the basis of the speed information of the mobile object on which the image sensing apparatus is mounted.

Therefore, by narrowing the width of the specific area for the case where the speed of the mobile object is equal to or greater than the specific speed than that for the case where the speed of the mobile object is smaller than the specific speed, it is possible to allow the second readout unit to sample the charge at a higher speed (i.e., to read out the charge with a higher frame rate). That is, since the relative speed of the target photographic object increases as the speed of the mobile object increases, it is necessary to perform the acquisition of the pixel data and the estimation of the information on the target photographic object at a higher speed. Therefore, it is possible to increase the frame rate by narrowing the width of the specific area so as to reduce the number of pixels reading out the charge (i.e., speeding up the acquisition speed of the pixel data), reduce the processing amount required for generating the control data such as a calculation process of the difference value, an extraction process of the edge, or a 2-dimensional LPF processing so as to speed up respective processes, and allow to keep track of an abrupt change in the target photographic object. Meanwhile, when the speed of the mobile object is smaller than the specific speed, by setting the width of the specific area in accordance with the speed of the mobile object, for example, by widening the width of the specific area to a width wider than that for the case where the speed of the mobile object is greater than the specific speed, it is possible to easily detect the target photographic object within the specific area (i.e., to monitor a wide range of areas). That is, by widening the width of the specific area, the target photographic object is likely to be positioned within the specific area and is not likely to be positioned beyond the specific area even when the shape of the target photographic object has been changed.

Aspect 13

An image sensing apparatus according to Aspect 13 is the image sensing apparatus according to any one of Aspects 1 to 12, wherein the control data generation unit is configured to estimate the position of the predetermined photographic object in the exposure area on the basis of the second pixel data having the plurality kinds of exposure times, and wherein the control data generation unit includes a position change unit for changing the position of the specific area on the basis of the estimated position.

With this arrangement, the position change unit allows to change the position of the specific area on the basis of the estimated position of the target photographic object.

Therefore, even when the target photographic object is moved to a position beyond the specific area, it is possible to change the position of the specific area to keep track of the movement of the target photographic object as long as the target photographic object is positioned within the exposure area. Accordingly, it is made easy to continuously detect the target photographic object in the specific area.

Aspect 14

According to Aspect 14 of an image sensing system, there is provided an image sensing system including a photoelectric conversion unit constituted by a plurality of photoelectric conversion elements converting exposed light into charge and accumulating the charge therein, the photoelectric conversion elements being arranged in a matrix, and an electronic shutter function for controlling an exposure time, the system including: a first readout unit that reads out charge from pixels composed of the photoelectric conversion elements of the photoelectric conversion unit using a destructive readout mode, the charge being accumulated in the pixels as a result of exposure for a predetermined exposure time; a second readout unit that reads out charge from pixels composed of the photoelectric conversion elements corresponding to a specific area in an entire exposure area of the photoelectric conversion unit over a plurality of times using a non-destructive readout mode, in a period when the first readout unit is reading out charge for one frame from the entire exposure area of the photoelectric conversion unit; an image data generation unit that generates an image data on the basis of a first pixel data composed of the charge read out by the first readout unit, the charge being obtained by exposing the entire exposure area to light for the predetermined exposure time; a control data generation unit that generates a control data on the basis of a second pixel data composed of the charge read out by the second readout unit, the charge being obtained by exposing the specific area to light with different exposure times; and a control data output unit that outputs the control data.

With this arrangement, it is possible to obtain the same effects and advantages as those obtainable in the image sensing apparatus according to Aspect 2.

The image sensing system of the aspect of the invention may be embodied as a single apparatus, a terminal, or equipment (in this case, the image sensing system is equivalent to that of Aspect 1), or may be embodied as a network system to which a plurality of apparatuses, terminals, or equipments are communicably connected. In the latter case, as long as each element is communicably connected thereto, the network system may belong to any of the plurality of apparatuses, terminals, or equipments.

Aspect 15

According to Aspect 15 of an image sensing method, there is provided an image sensing method for use in an image sensing apparatus including a photoelectric conversion unit constituted by a plurality of photoelectric conversion elements converting exposed light into charge and accumulating the charge therein, the photoelectric conversion elements being arranged in a matrix, and an electronic shutter function for controlling an exposure time, the method including: a first readout step for reading out charge from pixels composed of the photoelectric conversion elements of the photoelectric conversion unit using a destructive readout mode, the charge being accumulated in the pixels as a result of exposure for a predetermined exposure time; a second readout step for reading out charge from pixels composed of the photoelectric conversion elements corresponding to a specific area in an entire exposure area of the photoelectric conversion unit over a plurality of times using a non-destructive readout mode, in a period when in the first readout step, charge for one frame is read out from the entire exposure area of the photoelectric conversion unit; an image data generation step for generating an image data on the basis of a first pixel data composed of the charge read out in the first readout step, the charge being obtained by exposing the entire exposure area to light for the predetermined exposure time; a control data generation step for generating a control data on the basis of a second pixel data composed of the charge read out in the second readout step, the charge being obtained by exposing the specific area to light with different exposure times; and a control data output step for outputting the control data.

With this arrangement, it is possible to obtain the same advantages as those obtainable in the image sensing apparatus according to Aspect 2.

BRIEF DESCRIPTION OF THE DRAWINGS

The invention will be described with reference to the accompanying drawings, wherein like numbers reference like elements.

FIGS. 13A to 13E are exemplary diagrams for showing a procedure for generating detection image data.

DESCRIPTION OF EXEMPLARY EMBODIMENTS

Hereinafter, embodiments of an image sensing apparatus related to the invention will be described with reference to the accompanying drawings. FIGS. 1 to 13 are diagrams for explaining the embodiments of the image sensing apparatus 1 related to the invention.

Figure 1:
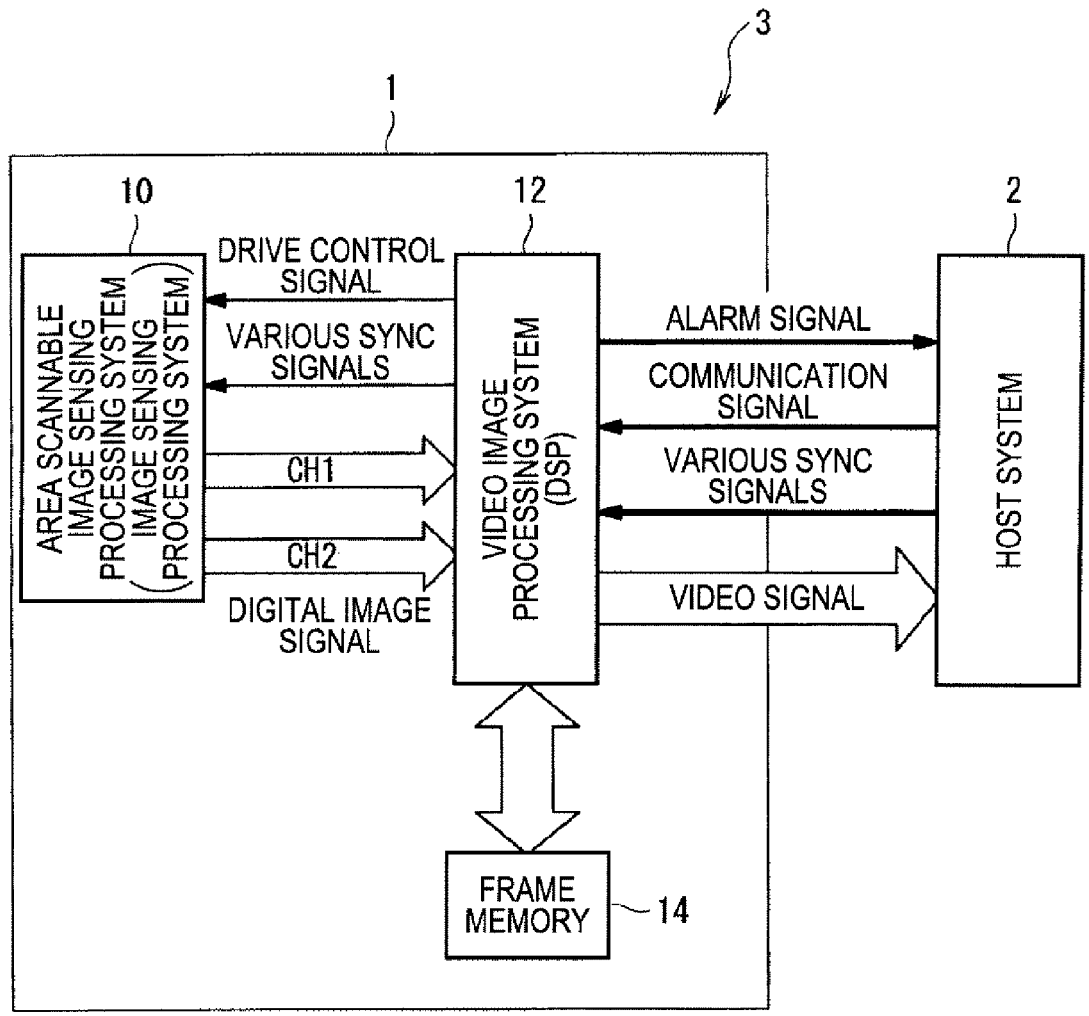
FIG. 1 is a schematic block diagram showing an arrangement of an image sensing system 3 in accordance with an embodiment of the invention.

First, a schematic arrangement of an image sensing system 3 employing the image sensing apparatus 1 related to the invention will be described with reference to FIG. 1. Here, FIG. 1 is a schematic block diagram showing an arrangement of the image sensing system 3 related to the invention. The image sensing system 3 related to the invention includes the image sensing apparatus 1 mounted on a mobile object and aims to monitor a target photographic object (target object) in a forward area of the mobile object.

As shown in FIG. 1, the image sensing system 3 is configured to include an image sensing apparatus 1 which senses, in one frame period (one exposure period), an image obtained by exposing an entire exposure area (an entire area) of a sensor cell array 56 (to be described later) to light for a normal exposure time (which can be arbitrarily set by a user, for example), senses, in the same one frame period, an image obtained by exposing a specific area (a portion of the exposure area) of the sensor cell array 56 to light with a plurality kinds of exposure times, and generates a control data on the basis of a sensing image data of the specific area; and a host system 2 which acquires the sensing image data having the normal exposure time from the image sensing apparatus 1 so as to display the image for the sensing image data or record and maintain the image sensing data, or acquires the control data from the image sensing apparatus 1 so as to control a control object on the basis of the control data.

As shown in FIG. 1, the image sensing apparatus 1 is configured to include an area scannable image sensing processing system 10 (hereinafter, referred to as an image sensing processing system 10) which reads out, in an exposure period having a normal exposure time, a pixel signal from respective pixel lines on an entire exposure area of a sensor cell array 56 (to be described later) having exposed with the normal exposure time using a destructive readout mode, reads out respective pixel signals, using a non-destructive readout mode, from respective pixel lines on a specific area of the sensor cell array 56 having exposed with a plurality kinds of exposure times (in the present embodiment, each of which is smaller than the normal exposure time and does not overlap with each other), and sequentially outputs a pixel data (digital data) of the pixel signals for each of the readout pixel lines; a video image processing system 12 which generates a normal image data (image data for visibility) on the basis of the pixel data corresponding to the exposure of the normal exposure time, acquired from the pixels on the entire exposure area and output from the area scannable image sensing processing system 10, generates a specific areal image data on the basis of the pixel data corresponding to the exposure of the plurality kinds of exposure times, acquired from the pixels on the specific area and output from the area scannable image sensing processing system 10, and generates a control data on the basis of the generated specific areal image data; and a frame memory 14 which stores various image data such as the normal image data or the specific areal image data.

Figure 2:
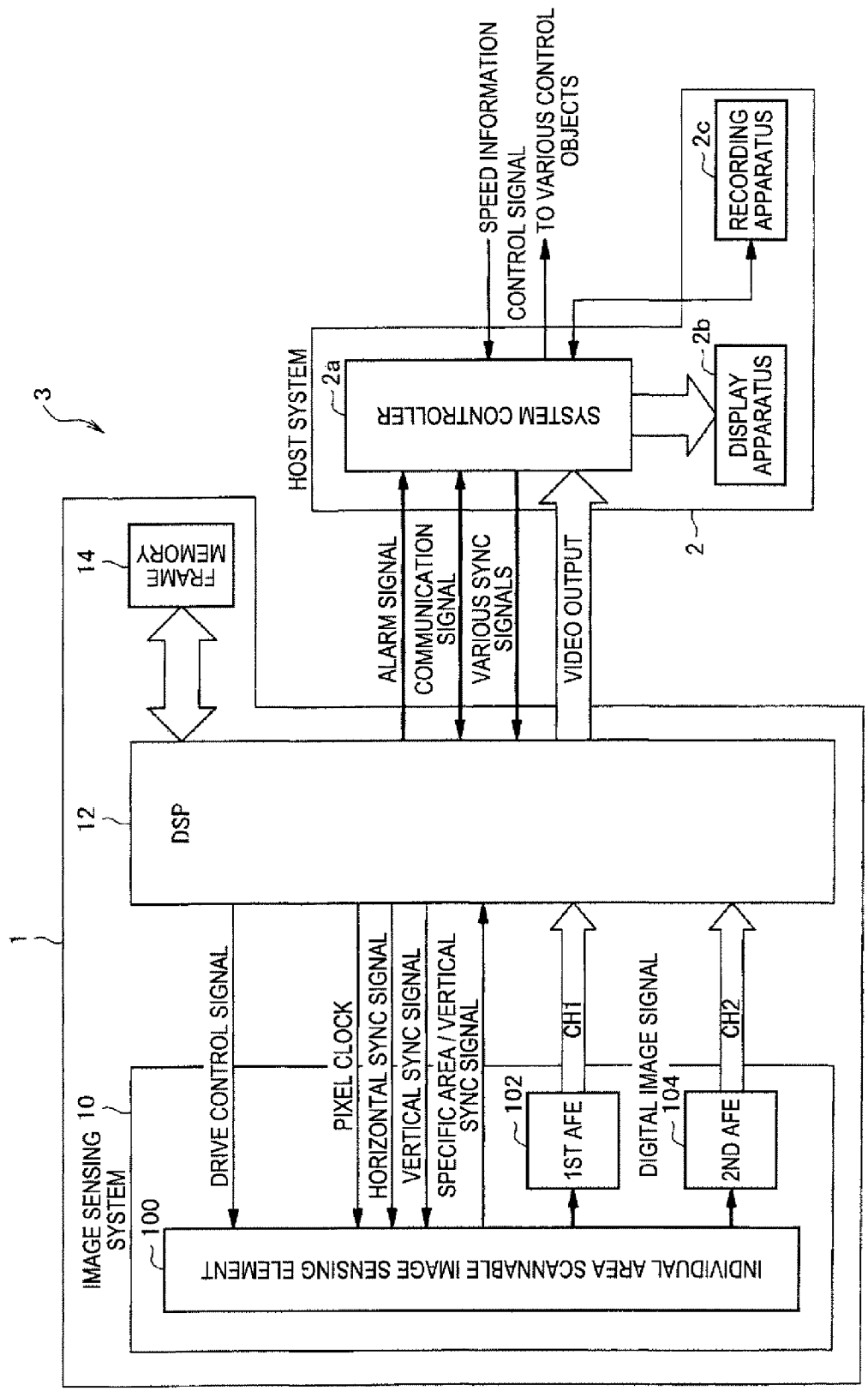
FIG. 2 is a block diagram showing an internal arrangement of an image sensing processing system 10 and a host system 2.
Figure 3:
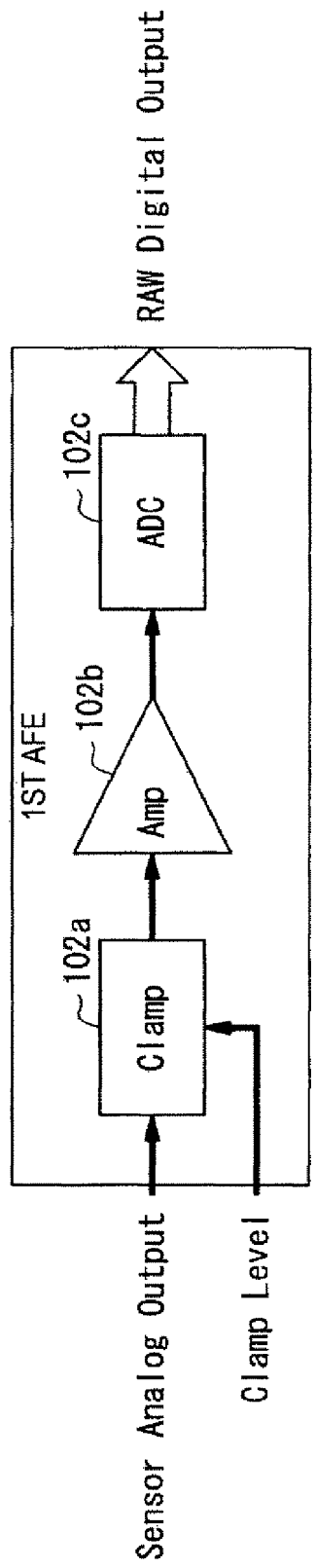
FIG. 3 a schematic diagram showing an internal arrangement of an AFE (Analog Front End) 102.
Figure 4:
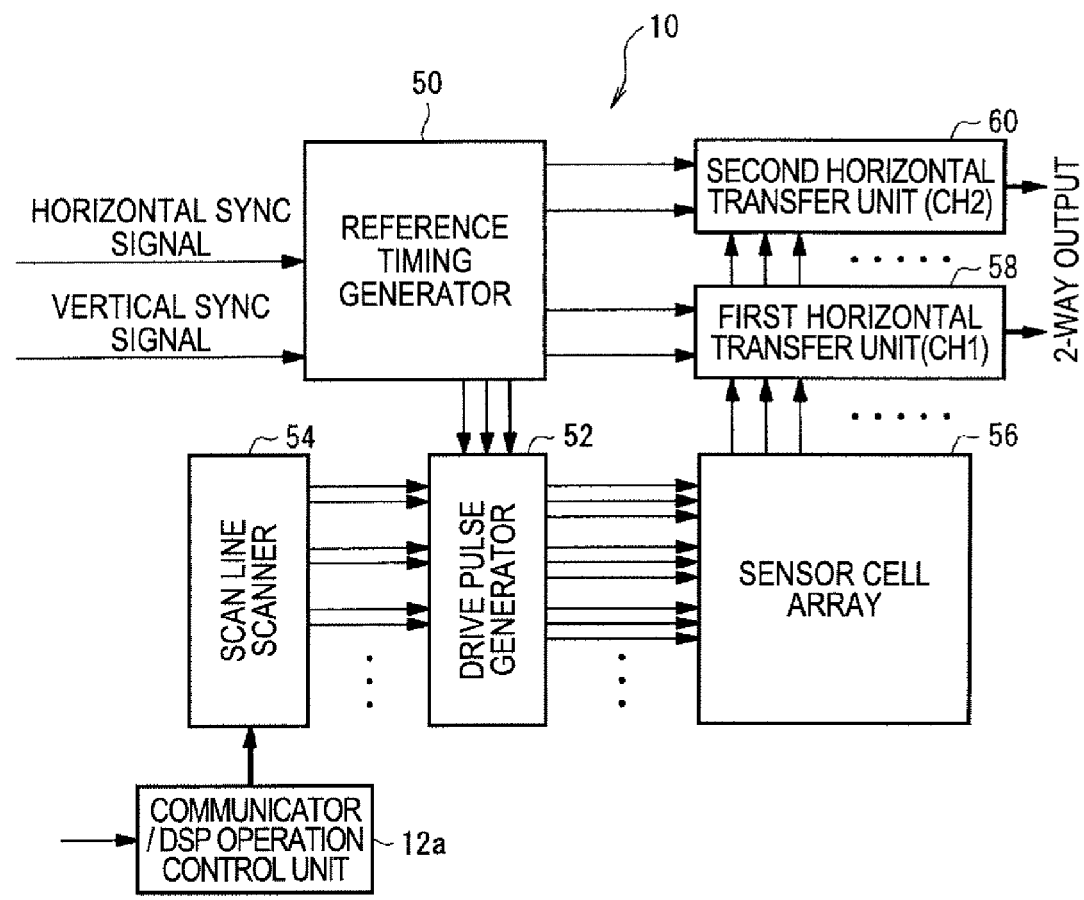
FIG. 4 is a block diagram showing an internal arrangement of an individual area scannable image sensing element 100.
Figure 5:
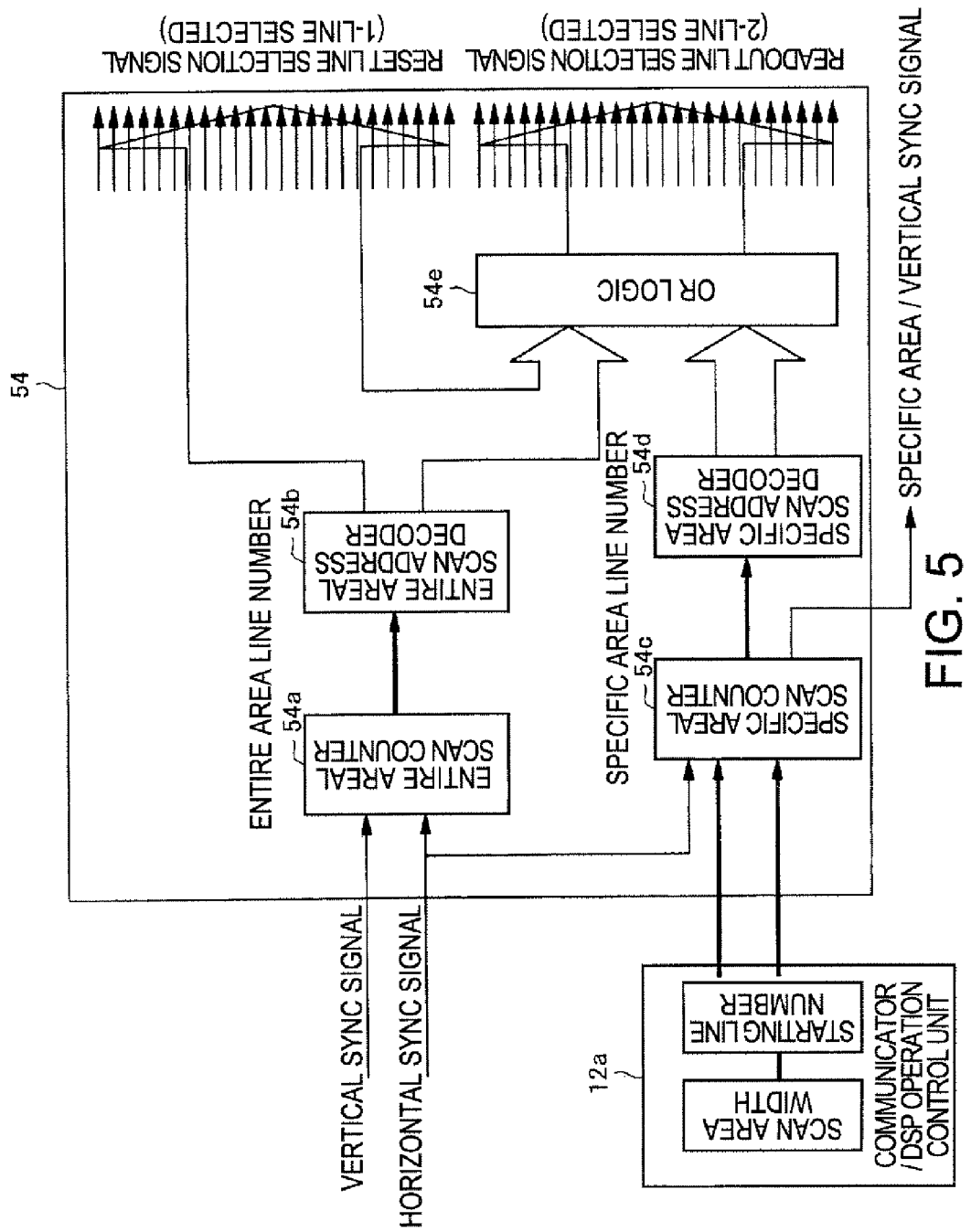
FIG. 5 is a schematic diagram showing an internal arrangement of a scan line scanner 54.
Figure 6:
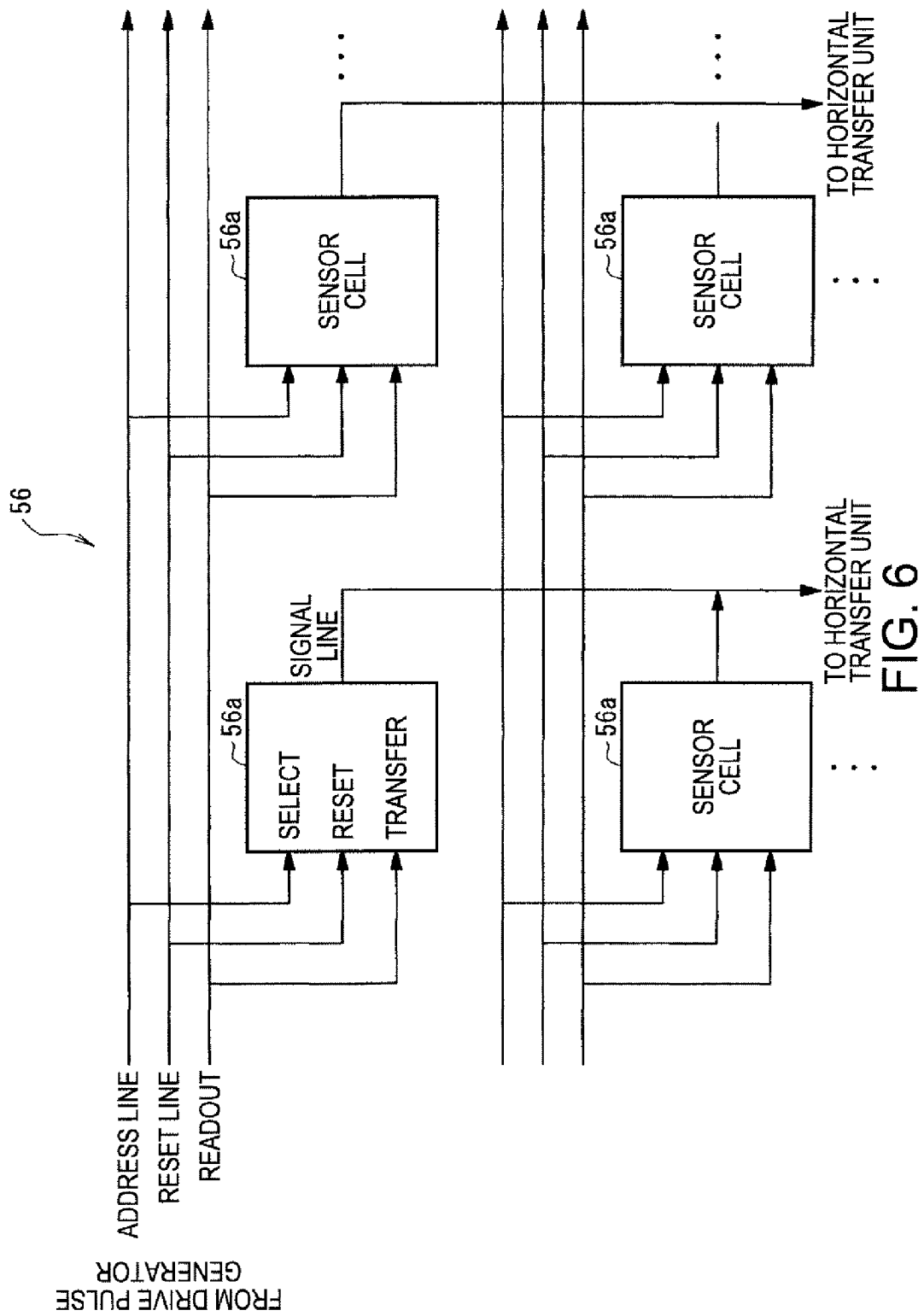
FIG. 6 is a schematic diagram showing a detailed arrangement of a sensor cell array 56.

Next, an internal arrangement of the image sensing processing system 10 will be described with reference to FIGS. 2 to 6. Here, FIG. 2 is a block diagram showing an internal arrangement of an image sensing processing system 10 and a host system 2; FIG. 3 a schematic diagram showing an internal arrangement of an AFE (Analog Front End) 102; FIG. 4 is a block diagram showing an internal arrangement of an individual area scannable image sensing element 100; FIG. 5 is a schematic diagram showing an internal arrangement of a scan line scanner 54; and FIG. 6 is a schematic diagram showing a detailed arrangement of a sensor cell array 56.

As shown in FIG. 2, the image sensing processing system 10 is configured to include an individual area scannable image sensing element 100, a first AFE 102, and a second AFE 104.

The individual area scannable image sensing element 100 (hereinafter, referred to as an image sensing element 100) condenses light from a photographic object onto a sensor cell array 56 (to be described later) using an image sensing lens (not shown) and accumulates charge corresponding to the amount of condensed light into pixels of the sensor cell array 56. The image sensing element 100 sequentially converts a group of charges accumulated in the respective pixel lines on an entire exposure area of the sensor cell array 56 into a group of voltages, on the basis of a drive signal (a pixel clock, a horizontal sync signal, and a vertical sync signal) supplied from a timing controller 12b (to be described later) of the video image processing system 12. Moreover, the image sensing element 100 sequentially converts a group of charges accumulated in the respective pixel lines on the specific area of the sensor cell array 56 into a group of voltages, on the basis of a specific area/vertical sync signal generated by a scan line scanner 54 to be described later.

The image sensing element 100 outputs the group of voltages converted from the group of charges obtained by exposing an entire exposure area to light with a normal exposure time through a first output channel (hereinafter, referred to as a CH1) configured to include a first line memory S and a first line memory N of a first horizontal transfer unit 58 (to be described later) to a first AFE 102. Moreover, the image sensing element 100 outputs the group of voltages sequentially converted from the group of charges obtained by exposing a specific area to light with a plurality kinds of exposure times through a second output channel (hereinafter, referred to as a CH2) configured to include a second line memory of a second horizontal transfer unit 60 (to be described later) to a second AFE 104. In the present embodiment, the charge is read out from the pixels on the entire exposure area through the CH1 using a destructive readout mode, and the charge is read out from the pixels on the specific area through the CH2 using non-destructive readout mode. Specifically, in one exposure period (a normal exposure time) using an electronic shutter function, the readout of the group of charges obtained by exposing the entire exposure area to light with the normal exposure time is performed independently from the readout of the group of charges obtained by exposing the specific area to light with the plurality kinds of exposure times.

Here, the destructive readout mode and the non-destructive readout mode have the following difference. In the destructive readout mode, a reset operation (a process for removing charge accumulated in a sensor cell) is performed immediately after a readout operation and then the readout operation continues. In this case, the readout signal (analog data) immediately before the reset operation is stored in the first line memory S and the readout signal immediately after the reset operation is stored in the first line memory N. In a differential amplifier 62 (to be described later), the corresponding pixel signals are subjected to a subtraction process, a signal level thereof is detected, and noise is removed therefrom. Meanwhile, in the non-destructive readout mode, the reset operation is not performed after the readout operation, and the signals (analog data) after the readout operation are stored in the second line memory. The pixel signals stored respectively in the first line memory and the second line memory are respectively output to the first AFE 102 and the second AFE 104 in synchronization with a pixel clock.

The first AFE 102 and the second AFE 104 convert voltage signals (analog data) corresponding to different exposure times, output through the CH1 of the first horizontal transfer unit 58 and the CH2 of the second horizontal transfer unit 60, into a digital data (hereinafter, referred to as a pixel data). The first AFE 102 and the second AFE 104 output the generated pixel data to a high-speed/specific areal image generation unit 12d (to be described later) and a normal image generation unit 12c (to be described later) of the video image processing system 12, respectively.

Next, an internal arrangement of the first AFE 102 will be described with reference to FIG. 3.

As shown in FIG. 3, the first AFE 102 is configured to include a clamp circuit 102a, an amplification circuit 102b, and an A/D conversion circuit 102c.

The clamp circuit 102a receives the pixel signal from the image sensing element 100, determines whether the pixel signal corresponds to a mask area, performs a clamp process to the entire input signals so that the signal level thereof becomes a black (reference) level when the pixel signal corresponds to the mask area, and outputs the clamped pixel signal to the amplification circuit 102b.

The amplification circuit 102b amplifies the clamped pixel signal to be compatible with the input range of the A/D converter and outputs the amplified pixel signal to the A/D conversion circuit 102c.

The A/D conversion circuit 102c converts the pixel signal (analog signal) from the amplification circuit 102b into a pixel data (digital data) and outputs the converted pixel signal to the video image processing system 12.

Since the second AFE 104 has the same internal arrangement as that of the first AFE 102, descriptions thereof will be omitted.

Next, an internal arrangement of the image sensing element 100 will be described with reference to FIG. 4.

As shown in FIG. 4, the image sensing element 100 is configured to include a reference timing generator 50, a drive pulse generator 52, a scan line scanner 54, a sensor cell array 56, a first horizontal transfer unit 58, and a second horizontal transfer unit 60.

The reference timing generator 50 generates a reference timing signal on the basis of the vertical sync signal and the horizontal sync signal from a timing controller 12b (to be described later) of the video image processing system 12.

The drive pulse generator 52 generates a drive pulse on the basis of a reference timing signal from the reference timing generator 50 and a reset line select signal and a readout line select signal from the scan line scanner 54 and supplies the drive pulse to the sensor cell array 56.

The scan line scanner 54 selects a position of a reset line for the entire exposure area to generate the reset line select signal and selects a position of a readout line for the entire exposure area to generate the readout line select signal, on the basis of various drive control signals. Moreover, the scan line scanner 54 selects a position of a readout line for the specific area to generate the readout line select signal, on the basis of a control signal for indicating a start line number and a scan area width, supplied from a communicator/DSP operation control unit 12a (to be described later) of the video image processing system 12. These generated select signals are output to the drive pulse generator 52.

Pixels in the sensor cell array 56 are configured by employing a CMOS technology, and the sensor cell array 56 exposes the pixels on the entire exposure area to light with the normal exposure time on the basis of the drive pulse supplied from the drive pulse generator 52, reads out the respective charge accumulated, during the exposure, in each pixel lines using the destructive readout mode, and sequentially outputs the respective readout charge to the first horizontal transfer unit 58. Meanwhile, in the exposure period having the normal exposure time, the sensor cell array 56 sequentially reads out the respective charge accumulated, during the respective exposure of the plurality kinds of exposure times, in the pixel lines on the specific area using the non-destructive readout mode and sequentially outputs the respective readout charge to the second horizontal transfer unit 60.

The first horizontal transfer unit 58 memorizes the pixel signal data for each pixel line corresponding to the normal exposure time, obtained from the entire exposure area of the sensor cell array 56, and the pixel signal data obtained immediately after the reset operation, respectively to the first line memory S and the first line memory N of the CH1, and outputs the memorized pixel signal data for the normal exposure time and the memorized pixel signal data immediately after the reset operation to the differential amplifier 62 (to be described later).

The second horizontal transfer unit 60 memorizes the pixel signal data for each pixel line corresponding to the plurality kinds of exposure times, acquired from the specific area of the sensor cell array 56 to the second line memory of the CH2 and outputs the memorized pixel signal data to the second AFE 104.

Next, an internal arrangement of the scan line scanner 54 will be described with reference to FIG. 5.

As shown in FIG. 5, the scan line scanner 54 is configured to include an entire areal scan counter 54a, an entire areal scan address decoder 54b, a specific area scan counter 54c, a specific areal scan address decoder 54d, and an OR logic 54e.

The entire areal scan counter 54a repeats a count-up operation on the basis of the vertical sync signal and the horizontal sync signal supplied from the reference timing generator 50. Here, the value of the entire areal scan counter 54a corresponds to the pixel line number of the entire exposure area, and the pixel line number is output to the entire areal scan address decoder 54b.

The entire areal scan address decoder 54b activates lines corresponding to the line number supplied from the entire areal scan counter 54a as a "readout line" and deactivates other lines. A readout line control signal for indicating a position (address) of the activated lines is output to the OR logic 54e and output to the drive pulse generator 52 as a reset line select signal.

The specific areal scan counter 54c repeats a count-up operation in asynchronization with the entire areal scan counter 54a on the basis of information indicating the start line number and the scan area width supplied from the communicator/DSP operation control unit 12a. Here, the value of the specific areal scan counter 54c corresponds to the pixel line number of the specific area, and the pixel line number is output to the specific areal scan address decoder 54d. The specific areal scan counter 54c generates a specific area/vertical sync signal corresponding to the vertical sync signal for the specific area and outputs the generated specific area/vertical sync signal to the timing controller 12b of the video image processing system 12.

The specific areal scan address decoder 54d activates lines corresponding to the line number supplied from the specific areal scan counter 54c as a "readout line" and deactivates other lines. A readout line control signal for indicating a position (address) of the activated lines is output to the OR logic 54e.

The OR logic 54e performs an OR operation for each line on the basis of the readout line control signal from the entire areal scan address decoder 54b and the readout line control data from the specific areal scan address decoder 54d and generates a final readout line select signal for the entire exposure area and a final readout line select signal for the specific area. These generated readout line select signals are output to the drive pulse generator 52.

Next, a detailed arrangement of the sensor cell array 56 will be described with reference to FIG. 6.

As shown in FIG. 6, in the sensor cell array 56, a plurality of sensor cells (pixels) 56a configured by employing the CMOS technology are arranged in a matrix. For each pixel line, three control lines such as address lines, reset lines, and readout lines are commonly connected to the sensor cell 56a constituting the pixel lines, and various drive signals are transmitted to the sensor cell 56a constituting the pixel lines through the three control lines. When the address line and the readout line are activated, accumulated charge is transferred through signal lines shown in FIG. 6 to the first or second horizontal transfer unit 58 or 60. With this arrangement, the pixel lines for the reset operation or the readout operation are activated (selected) by the address line. When performing a reset operation, a signal for instructing the reset operation is supplied through the reset line to the sensor cell 56a for the pixel line selected by the select signal. When performing a readout operation of the pixel signal, a signal for instructing the transfer of the accumulated charge is supplied through the readout line to the sensor cell 56a for the pixel line selected by the select signal.

Next, a method of controlling the exposure time of the image sensing element 100 and a method of reading out the pixel signal from the sensor cell array 56 will be described with reference to FIG. 7. Here, FIG. 7 is a schematic diagram showing an example of an exposure operation and a readout operation of the image sensing element 100 in which pixel lines of the sensor cell array 56 are exposed to light and a pixel signal is read out therefrom.

In the invention, to control the exposure time, the entire exposure area (entire scan area) of the sensor cell array 56 is provided with a normal scan line (readout line) L1 for clearing (reset) charge accumulated in the respective pixel lines on the entire exposure area and reading out a pixel signal for the normal exposure time, and the specific area (specific scan area) of the sensor cell array 56 is provided with a high-speed scan line (readout line) L2 for reading out a pixel signal for a plurality kinds of exposure times using the non-destructive readout mode. Moreover, in one exposure period (normal exposure time), the operation of reading out and resetting the pixel signal for the normal exposure time is performed independently from the operation of reading out the pixel signal for the plurality kinds of exposure times using the non-destructive readout mode. That is, as shown in FIG. 7, the normal scan line L1 and the high-speed scan line L2 are configured such that when charge corresponding to the normal exposure time is sequentially accumulated on pixel lines (for example, first to 18-th lines) on the entire exposure area, the normal scan line L1 is activated so that the pixel signal on each pixel line is sequentially read out and the accumulated charge is sequentially cleared. Meanwhile, in pixel lines (for example, 9-th to 12-th lines) on the specific area, in a period where the charge corresponding to the normal exposure time is accumulated in the pixel lines, the high-speed scan line L2 is activated so that the pixel signal on each pixel line is sequentially read out in each of the plurality kinds of exposure times using the non-destructive mode.

Figure 7:
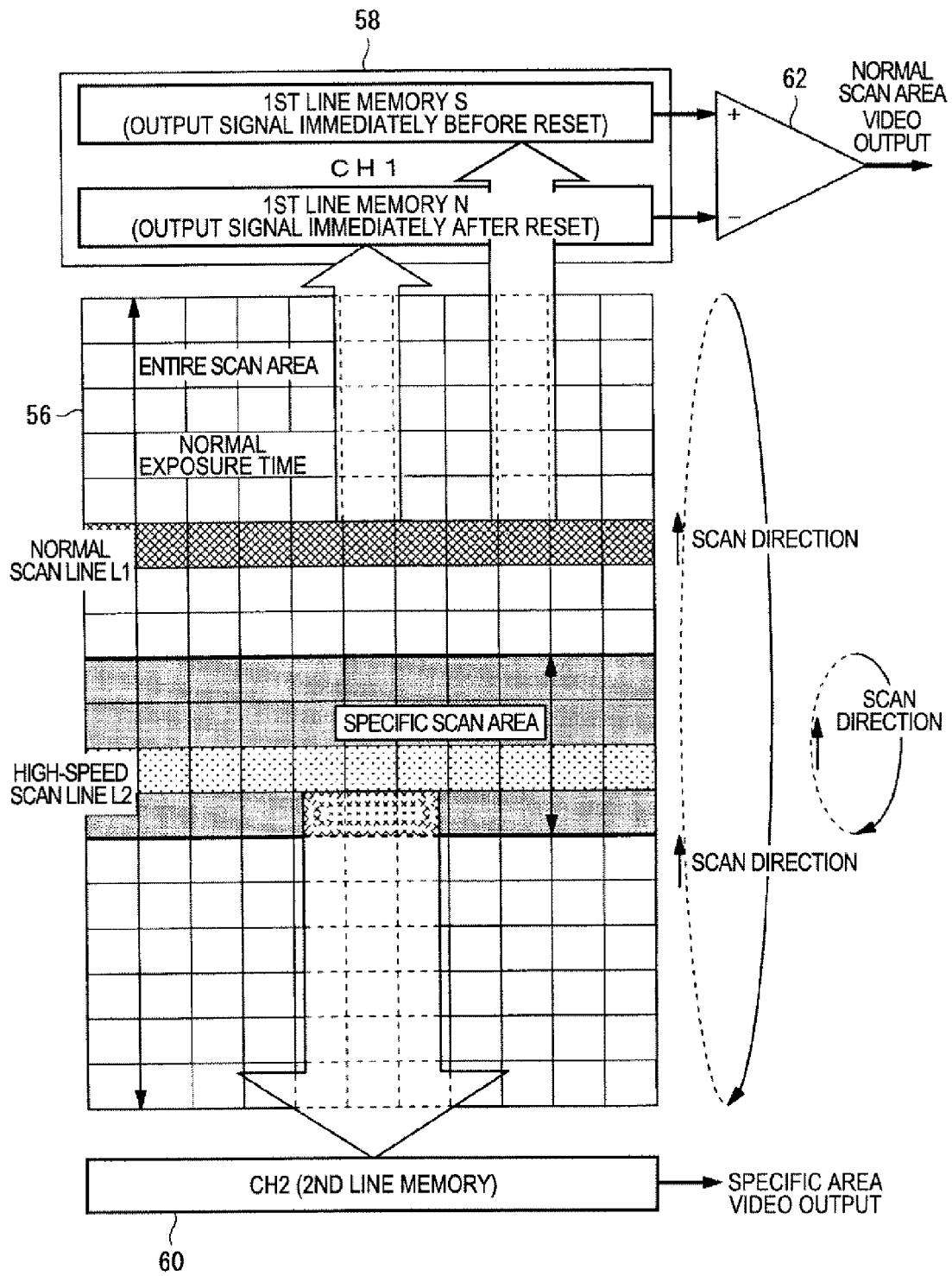
FIG. 7 is a schematic diagram showing an example of an exposure operation and a readout operation of the image sensing element 100 in which pixel lines of the sensor cell array 56 are exposed to light and a pixel signal is read out therefrom.

In the present embodiment, as shown in FIG. 7, the pixel signal (analog data) for the entire exposure area having exposed with the normal exposure time is read out to the first line memory S of the CH1, and the pixel signal obtained after the reset operation is read out to the first line memory N of the CH1. The readout pixel signals are output to the differential amplifier 62 provided to the output of the first horizontal transfer unit 58 as shown in FIG. 7, and in the differential amplifier 62, the corresponding pixel signals before and after the reset operation are subjected to a subtraction process, a signal level thereof is detected, and noise is removed therefrom. The pixel signal having subjected to the subtraction process is output to the first AFE 102 and converted therein into a digital data (pixel data). Meanwhile, the pixel signal for the specific area having exposed with the plurality kinds of exposure times is read out to the second line memory of the CH2, output to the second AFE 104, and then converted therein into a digital data (pixel data).

As shown in FIG. 7, to control timings for reading out the pixel signal in the normal scan line L1 and the high-speed scan line L2, the normal scan line L1 is sequentially (in FIG. 7, in an upward direction) scanned for each pixel line on the entire exposure area. In this case, in the normal scan line L1, the accumulated charge is cleared (reset) and the pixel signal for those pixels having exposed with the normal exposure time before and after the clearing (resetting) of the accumulated charge is read out. When the readout and reset operations are performed to the pixel signal on the first line and then the entire pixel signal is read out from the line memory to the outside, the normal scan line L1 is sequentially scanned. When the normal scan line L1 returns again to the first line, the operation of scanning the normal scan line L1 is performed at the end of the normal exposure time. In this sequence, the operation of reading out the pixel signals for the normal exposure and the operation of clearing (resetting) the accumulated charge are sequentially performed to the pixel lines of the sensor cell array 56 on the entire exposure area. Meanwhile, in the specific area, when the accumulated charge is cleared (reset) by the normal scan line L1, an operation of the high-speed scan line L2 for non-destructively reading out the pixel signal for those pixels having exposed with the plurality kinds of exposure times is sequentially performed, in the increasing order of the exposure times, to the pixel lines after the clearing (resetting) operation. In this sequence, the operation of non-destructively reading out the pixel signals for the exposure with the plurality kinds of exposure times is sequentially performed to the pixel lines of the sensor cell array 56 on the specific area.

In the present embodiment, in order to synchronize the operation of the normal scan line L1 reading out the pixel signal and the operation of the high-speed scan line L2 reading out the pixel signal, by dividing the readout period (transfer period for the line memory) set by the horizontal sync signal into two-separate readout periods, the pixel signal is read out, during one separate readout period, to the first line memory S of the CH1 by the normal scan line L1, and the pixel signal is read out, during the other separate readout period, to the second line memory of the CH2 by the high-speed scan line L2, thereby preventing concurrent occupancy of the readout period.

Figure 8:
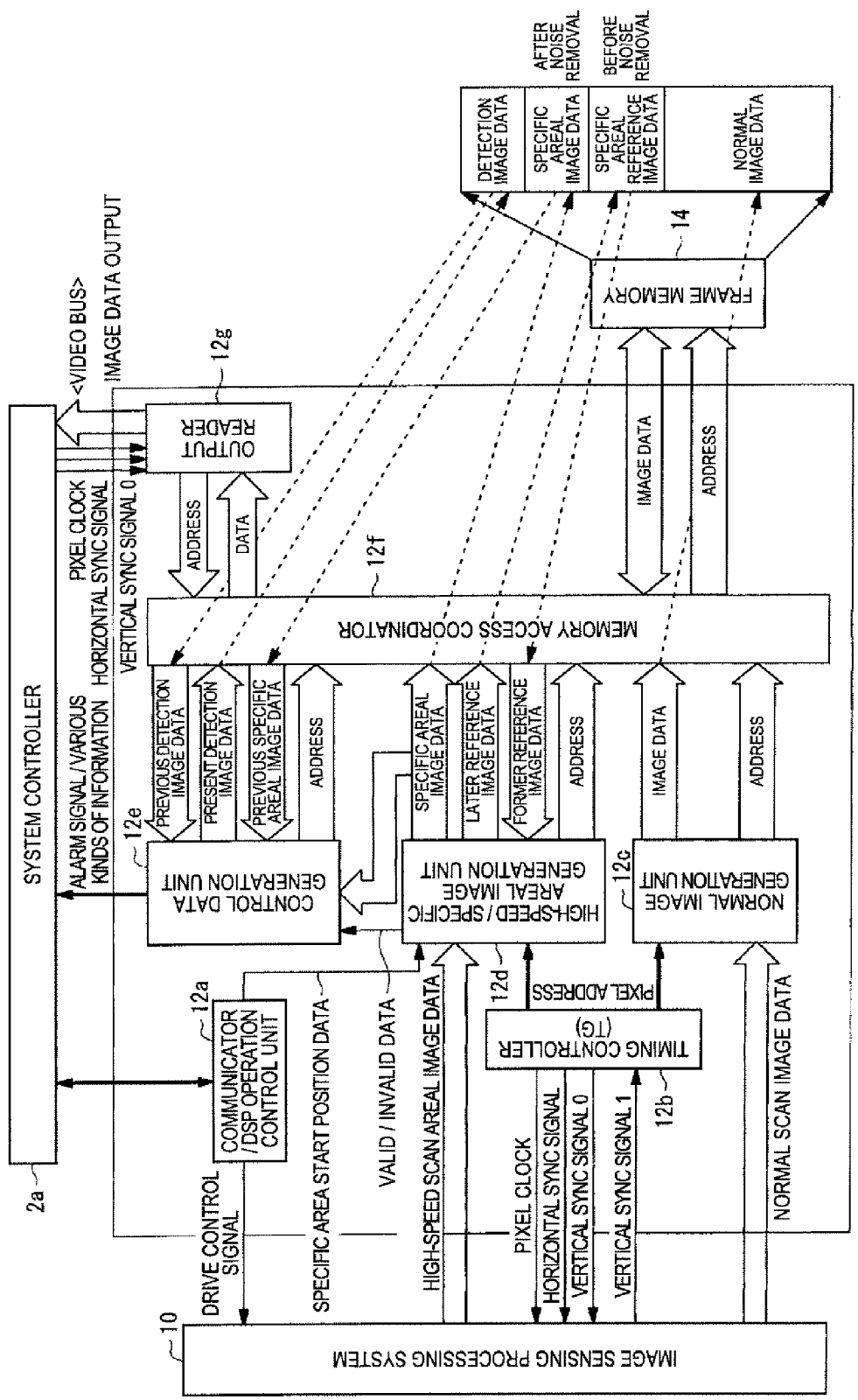
FIG. 8 is a block diagram showing an internal arrangement of a video image processing system 12.
Figure 9:
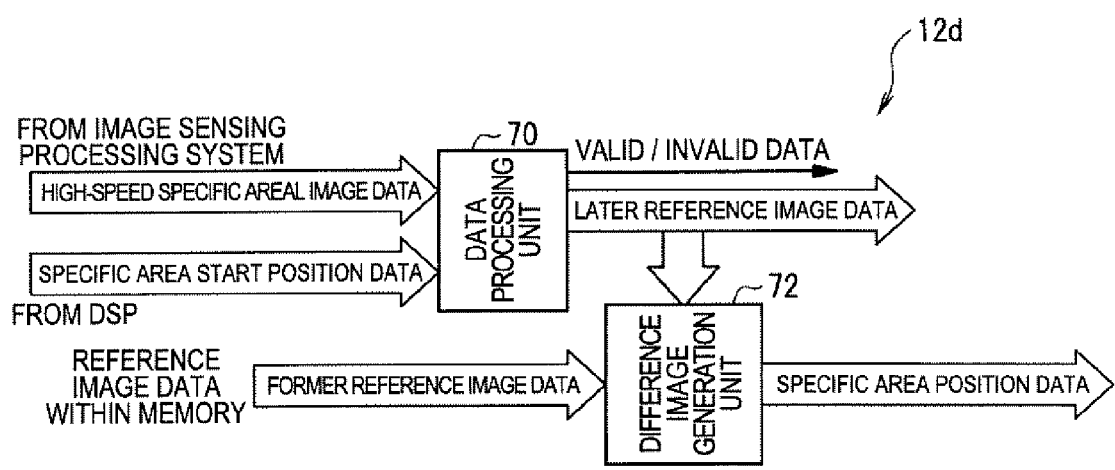
FIG. 9 is a block diagram showing an internal arrangement of a high-speed/specific areal image generation unit 12d.
Figure 10:
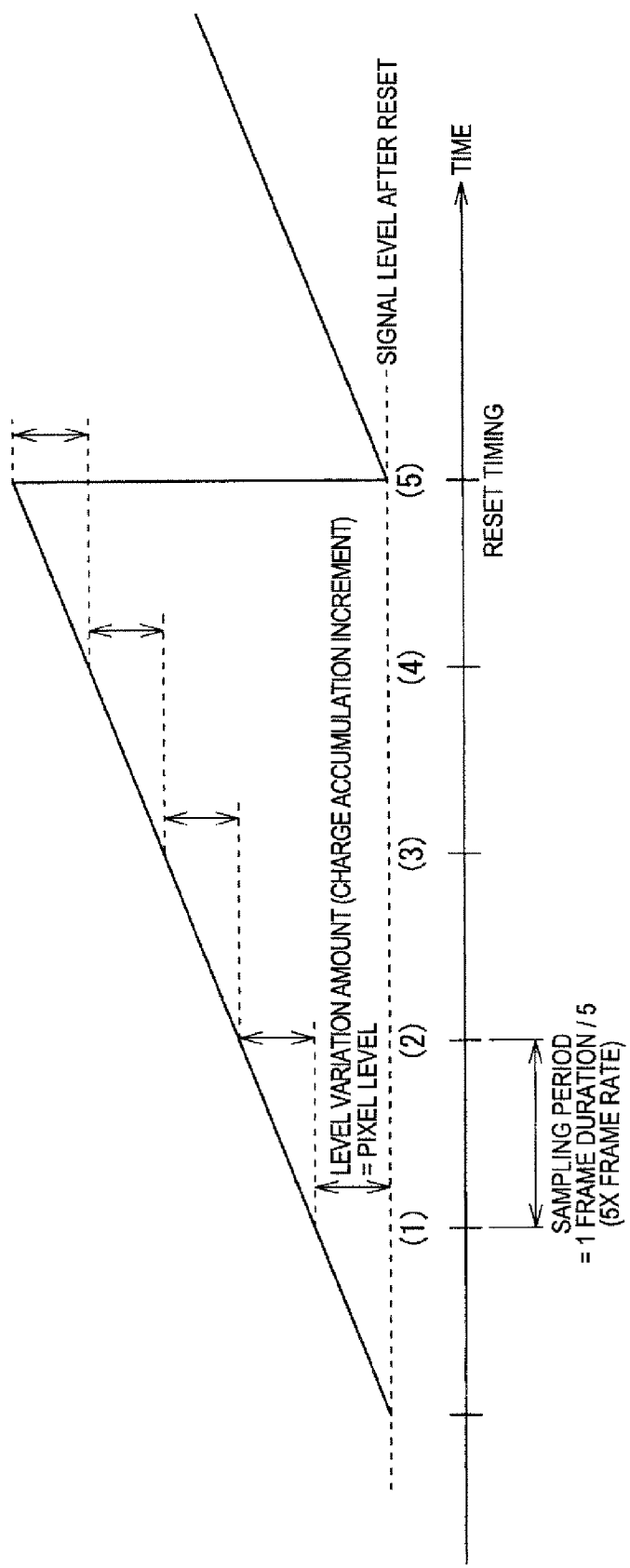
FIG. 10 is a schematic diagram showing a change in the amount of charge accumulated in a pixel in a destructive readout mode.
Figure 11:
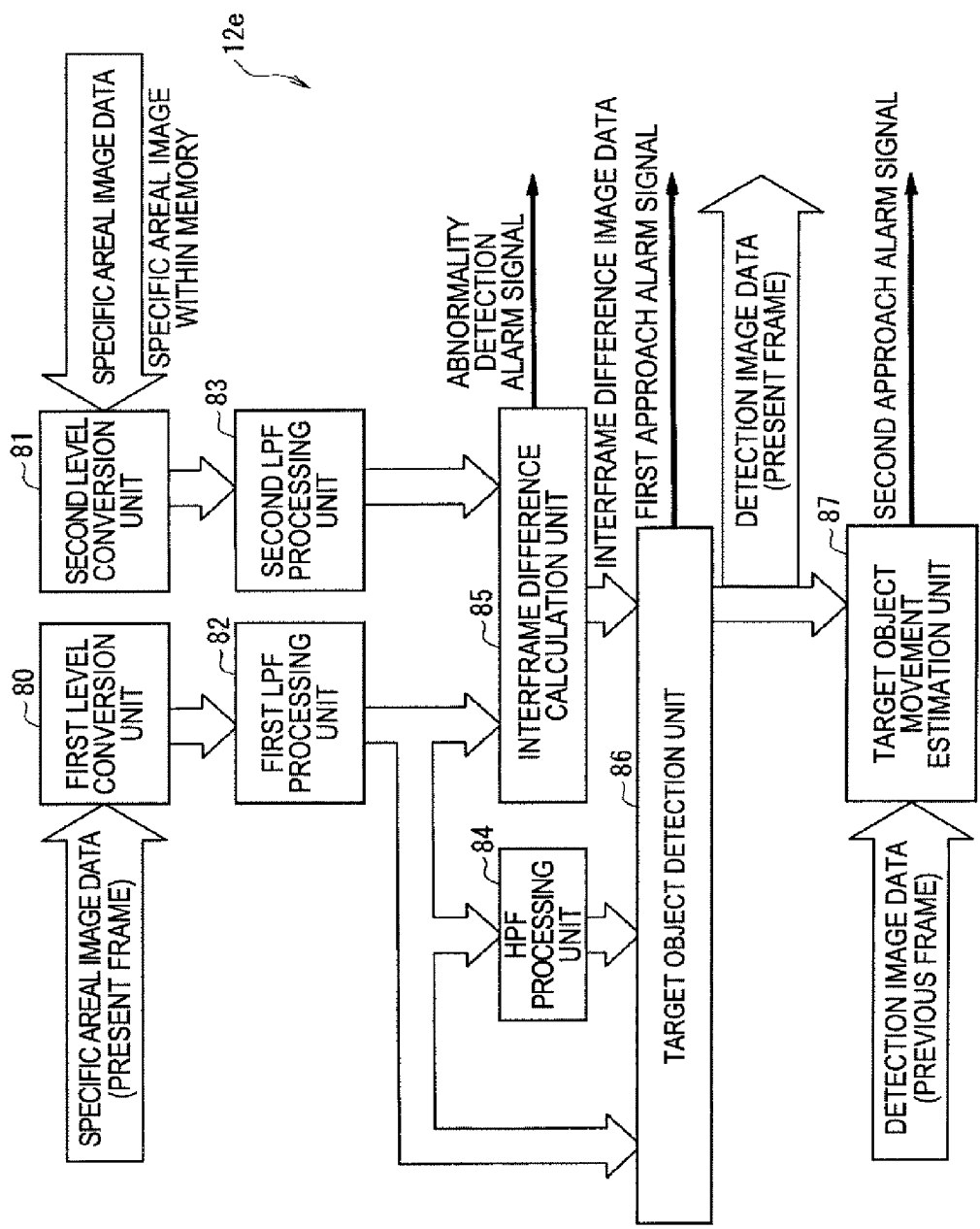
FIG. 11 is a block diagram showing an internal arrangement of a control data generation unit 12e.

Next, an internal arrangement of the video image processing system 12 will be described with reference to FIGS. 8 to 11. Here, FIG. 8 is a block diagram showing an internal arrangement of a video image processing system 12; FIG. 9 is a block diagram showing an internal arrangement of a high-speed/specific areal image generation unit 12d; FIG. 10 is a schematic diagram showing a change in the amount of charge accumulated in a pixel in a destructive readout mode; and FIG. 11 is a block diagram showing an internal arrangement of a control data generation unit 12e.

As shown in FIG. 8, the video image processing system 12 is configured to include a communicator/DSP operation control unit 12a, a timing controller 12b, a normal image generation unit 12c, a high-speed/specific areal image generation unit 12d, a control data generation unit 12e, a memory access coordinator 12f, and an output reader 12g.

The communicator/DSP operation control unit 12a acquires information on a start line number and a scan area width for the specific area of the sensor cell array 56 from a system controller 2a (to be described later) and outputs a drive control signal for indicting the acquired start line number and the acquired scan area width to the scan line scanner 54 of the image sensing processing system 10. Moreover, the communicator/DSP operation control unit 12a acquires, from the system controller 2a, a specific area start position data for indicating whether the start position and width of the specific area is changed and outputs the acquired specific area start position data to the high-speed/specific areal image generation unit 12d.

The timing controller 12b generates the drive signals (a pixel clock, a horizontal sync signal, and a vertical sync signal) for the image sensing element 100 and outputs the generated drive signals to the reference timing generator 50 of the image sensing element 100. Moreover, since the pixel position (pixel column (line) number or pixel number) on the sensor cell array 56 of the image sensing element 100 corresponding to the pixel signal obtained by exposing the entire exposure area to light with the normal exposure time and output from the CH1 of the image sensing processing system 10 can be known from the horizontal sync signal and the vertical sync signal, the timing controller 12b generates the pixel column (line) number (hereinafter, referred to as "address information") and outputs the address information to the normal image generation unit 12c. Moreover, since the pixel position on the sensor cell array 56 of the image sensing element 100 corresponding to the pixel signal obtained by exposing the specific area to light with the plurality kinds of exposure times and output from the CH2 of the image sensing processing system 10 can be known from the horizontal sync signal and the vertical sync signal for a specific area supplied from the image sensing processing system 10, the timing controller 12b generates the pixel column (line) number (hereinafter, referred to as "address information") and outputs the address information to the high-speed/specific areal image generation unit 12d.

The normal image generation unit 12c acquires, through the first AFE 102, the pixel data (hereinafter, referred to as a normal scan image data) generated from the pixel signal read out from the image sensing processing system 10 at the time of scanning a normal scan line L1. Then, the normal image generation unit 12c generates data of a normal image for visibility (hereinafter, referred to as a normal image data) on the basis of the acquired normal scan image data and memorizes the generated normal image data to the frame memory 14 through the memory access coordinator 12f.

As shown in FIG. 9, the high-speed/specific areal image generation unit 12d is configured to include a data processing unit 70 and a difference image generation unit 72.

The data processing unit 70 acquires, through the second AFE 104, the pixel data (hereinafter, referred to as a high-speed scan areal image data) generated from the pixel signal read out from the image sensing processing system 10 at the time of scanning a high-speed scan line L2 and acquires the specific area start position data from the communicator/DSP operation control unit 12a. When it is determined on the basis of the specific area start position data that the start position and width of the specific area are changed, an invalid flag is set to the high-speed scan areal image data corresponding to the first one scanning after the change in the specific area. Meanwhile, when it is determined that the start position is not changed, a valid flag is set to the acquired high-speed scan areal image data. The high-speed scan areal image data having the valid or invalid flag is output to the difference image generation unit 72 and memorized to the frame memory 14 through the memory access coordinator 12f. That is, since the exposure time is changed as the width of the specific area is changed, the width may change in the course of the scanning depending on the timing of the change. Thus, in a period of the first one scanning operation after the change, the pixel data obtained with the exposure time after the change may coexist with the pixel data obtained with the exposure time before the change. Therefore, to prevent a further processing of the high-speed scan areal image data corresponding to the first one scanning operation after the change in a later stage, the invalid flag is set to the high-speed scan areal image data. Meanwhile, the high-speed scan areal image data acquired from the image sensing processing system 10 is memorized and maintained in the frame memory 14, for the difference image generation unit 72 to use the high-speed scan areal image data in computation of the difference value. Hereinafter, the memorized and maintained high-speed scan areal image data is referred to as a specific areal reference image data.

Upon acquiring the specific areal image data having the valid or invalid flag from the data processing unit 70, the difference image generation unit 72 reads out the specific areal reference image data acquired at the time of the scanning (exposure time) immediately before that for the acquired specific areal image data from the frame memory 14 through the memory access coordinator 12f, calculates (subtracts) a difference between the pixel value represented by the respective pixel data constituting the specific areal image data and the pixel value represented by the respective pixel data constituting the specific areal reference image data having the same pixel position as the respective pixel data constituting the specific areal image data, and generates the specific areal image data from the difference value obtained through the calculation (subtraction).

Next, for explanation of operations of the difference image generation unit 72, a change in pixel charge accumulation amount of respective pixels on the sensor cell array 56 will be described with reference to FIG. 10.

As shown in FIG. 10, the amount of charge accumulated in the respective pixel on the sensor cell array 56 during the exposure of one frame (normal exposure time) increases with the lapse of time. Since the charge is read out from the respective pixel on the specific area using the non-destructive readout mode, the amount of charge accumulated in the respective pixel is constantly maintained even after several readout operations are performed in the course of the exposure. In FIG. 10, reset timings are timings for clearing the charge accumulated in the sensor cell array 56 and thus rule the normal exposure time. In the specific area, the charge is read out from the specific area at the timings of (1) to (5) as shown in FIG. 10, and images are generated from the difference as described above. Specifically, the images are generated from the difference between the charge amount read out at the timing (2) and later and the charge amount read out at the timing immediately before the above timings. Such an image generation based on the difference implies an image generation with a frame rate being 5-times higher than a normal frame rate and thus an exposure time being 5-times shorter than a normal exposure time.

Since the high-speed scan areal image data acquired from the image sensing processing system 10 is composed of the charge read out using the non-destructive readout mode, fixed pattern noise components are likely to be mixed therein. Therefore, the fixed pattern noise components are removed by calculating the difference value.

The difference image generation unit 72 outputs, to the control data generation unit 12e, the generated specific areal image data and the valid or invalid flag set to the generated specific areal image data and memorizes them in the frame memory 14 through the memory access coordinator 12f.

Referring to FIG. 8, the control data generation unit 12e is configured to include first and second level conversion units 80 and 81, first and second LPF processing units 82 and 83, an HPF processing unit 84, a interframe difference calculation unit 85, a target object detection unit 86, and a target object movement estimation unit 87, as shown in FIG. 11.

Upon acquiring the specific areal image data (hereinafter, referred to as a present specific areal image data) for a present frame of the specific area from the high-speed/specific areal image generation unit 12d, the first level conversion unit 80 converts the multi-valued pixel value (here, referred to as a luminance value) of the present specific areal image data into a format suitable for the high-speed processing such as a 2-valued or 4-valued format. The converted present specific areal image data is output to the first LPF processing unit 82.

Upon acquiring the specific areal image data (hereinafter, referred to as a previous specific areal image data) for the frame previous to the present frame of the present specific areal image data from the frame memory 14 through the memory access coordinator 12f, the second level conversion unit 81 converts the multi-valued pixel value of the previous specific areal image data into a format suitable for the high-speed processing such as a 2-valued or 4-valued format, similar to the first level conversion unit 80. The converted present specific areal image data is output to the second LPF processing unit 83. In the present embodiment, the specific areal image data at least for a frame previous to the present frame is memorized and maintained in the frame memory 14.

The first LPF processing unit 82 performs a filtering process to the present specific areal image data supplied from the first level conversion unit 80 using a 2-dimensional LPF, and removes, from the image data, a portion of the present specific areal image (negligible changes in the image) that is not related to the target object (target photographic object) such as shallow raised or grooved stripes. The filtered present specific areal image data is output to the HPF processing unit 84 and the target object detection unit 86.

Similar to the first LPF processing unit 82, the second LPF processing unit 83 performs a filtering process to the previous specific areal image data supplied from the second level conversion unit 81 using the 2-dimensional LPF, and removes, from the image data, a portion of the image (negligible changes in the image) that is not related to the target object.

The HPF processing unit 84 performs a filtering process to the present specific areal image data supplied from the first LPF processing unit 82 using a 2-dimensional high-pass filter (hereinafter, referred to as a 2-dimensional HPF) to detect an edge portion in the present specific areal image and generates a first edge image data constituted by the image data for the detected edge portion. The first edge image data is output to the target object detection unit 86.

The interframe difference calculation unit 85 calculates a difference value between the respective pixel values for the present specific areal image data supplied from the first LPF processing unit 82 and the respective pixel values for the previous specific areal image data supplied from the second LPF processing unit 83, having the same pixel position as the respective pixel values for the present specific areal image data and generates an interframe difference image data constituted by the difference value. The generated interframe difference image data is output to the target object detection unit 86. Then, the interframe difference calculation unit 85 compares the calculated difference values with predetermined specific threshold value to count the number of difference values equal to or greater than the specific threshold value. When the total number of difference values (pixels) equal to or greater than the threshold value is equal to or greater than a predetermined threshold value, the interframe difference calculation unit 85 determines that an abnormal situation has been occurred, generates an abnormality detection alarm signal, and outputs the generated abnormality detection alarm signal to the system controller 2a. That is, a great change in the difference image (the total number of the differential values being equal to or greater than the threshold value) implies that a new object has suddenly appeared in the image.

The target detection unit 86 detects the target object from the present specific areal image data on the basis of the present specific areal image data supplied from the first LPF processing unit 82, the first edge image data supplied from the HPF processing unit 84, and the interframe difference image data supplied from the interframe difference calculation unit 85. For example, a second edge image data is generated from the interframe difference image data, a detection image data (hereinafter, referred to as a present detection image data) constituted by an edge image data obtained by summing the first and second edge image data is generated from the first edge image data and the second edge image data, thereby estimating the position or shape of the target object from the present detection image data. Then, it is determined, from the estimated shape, whether the size of the target object reaches a predetermined threshold value, a first approach alarm signal is generated when the size of the target object is equal to or greater than the threshold value, and the first approach alarm signal is output to the system controller 2a. The generated present detection image data is output to the target object movement estimation unit 87 and then memorized in the frame memory 14 through the memory access coordinator 12f.

Upon receiving the present detection image data from the target object detection unit 86, the target object movement estimation unit 87 acquires a detection image data (hereinafter, referred to as a previous detection image data) corresponding to a frame previous to the present frame of the present detection image data from the frame memory 14 through the memory access coordinator 12f. Then, the target object movement estimation unit 87 estimates a change in the size or position of the target object from a relative positional relation between the target objects in both present and previous detection images, on the basis of the present detection image data and the previous detection image data. When it is determined from the estimation result that the target object is approaching closer, the target object movement estimation unit 87 generates a second approach alarm signal and outputs the second approach alarm signal to the system controller 2a.

Referring to FIG. 8, upon receiving readout and write commands for the frame memory 14 from four sources, i.e., from the normal image generation unit 12c, the high-speed/specific areal image generation unit 12d, the control data generation unit 12e, and the output reader 12g, the memory access coordinator 12f coordinates the four-types of access requests for accessing the image data stored in the frame memory 14 and enables the accesses.

The output reader 12g reads out the normal image data in the frame memory 14 through the memory access coordinator 12f in synchronization with the output timing signal from the system controller 2a and outputs the readout normal image data to the system controller 2a.

As shown in FIG. 8, the frame memory 14 memorizes therein various image data such as the detection image data, the specific areal image data, the specific areal reference image data, and the normal image data and reads out corresponding pixel data in response to the readout request from the memory access coordinator 12f. Moreover, the frame memory 14 writes corresponding pixel data in responds to the write request from the memory access coordinator 12f.

Hereinafter, referring to FIG. 2, an internal arrangement of the host system 2 will be described.

The host system 2 is configured to include a system controller 2a, a display apparatus 2b, a recording apparatus 2c, and an alarm device 2d.

The system controller 2a acquires the normal image data for visibility from the video image processing system (DSP) 12, and displays the normal image on the display apparatus 2b or records the acquired normal image data to the recording apparatus 2c, on the basis of the acquired normal image data. Moreover, the system controller 2a controls various control objects on the basis of various alarm signals supplied from the video image processing system 12. For example, the system controller 2a controls the control object such as a warning sound output device to output the warning sound when the first approach alarm signal is acquired, and controls the control object such as a braking system or a steering system in addition to the warning sound output device to avoid a danger when the abnormality detection alarm signal or the second approach alarm signal is acquired. Moreover, the system controller 2a acquires information on the position and shape of the target object from the control data generation unit 12e of the video image processing system 12, and changes (i.e., keeps track of the target object) the start position of the specific area in correspondence with the present position and size of the target object, on the basis of the position and shape information. Furthermore, the system controller 2a acquires information on the speed of the mobile object having the image sensing system of the invention mounted thereon and changes the start position and the scan area width of the specific area on the basis of the speed information. Specifically, the scan area width of the specific area is narrowed from a normal width when the speed of the mobile object is equal to or greater than a predetermined speed, and the scan area width of the specific area is widened from the normal width when the speed of the mobile object is smaller than a predetermined speed.

The display apparatus 2b is configured as a display device such as an LCD and is configured to display an image corresponding to the normal image data acquired from the video image processing system 12 or an image corresponding to the normal image data recorded to the recording apparatus 2c.

The recording apparatus 2c records the normal image data acquired from the video image processing system 12. The recorded normal image data is used for further reproducing purpose, for example, in case of an accident, the image data may be used to reproduce corresponding video images sensed at the time of the accident. Therefore, the normal image data requires good visibility for observing detailed contents of the image. That is, the recording apparatus 2c functions as a drive recorder.

Next, a practical operation of the present embodiment will be described with reference to FIGS. 12 and 13. Here, FIG. 12 is a diagram showing an example of a sensing object image (a monitoring image); and FIGS. 13A to 13E are exemplary diagrams for showing a procedure for generating detection image data.

Figure 12:
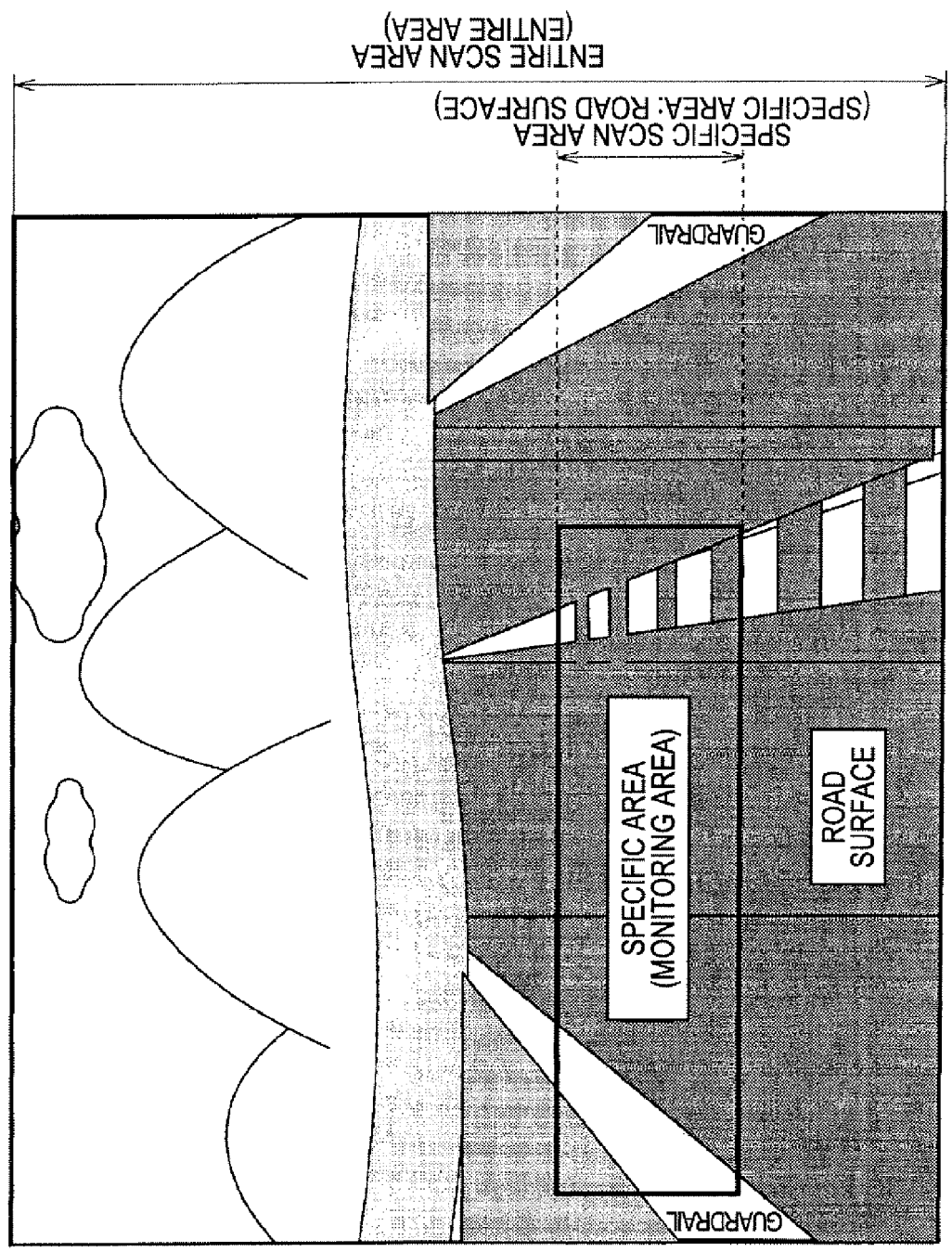
FIG. 12 is a diagram showing an example of a sensing object image (a monitoring image).

Hereinafter, an operation of the image sensing system 3 will be described in which the image sensing apparatus 1 is mounted on a vehicle and is used to sense an image of the road surface and the scene as a sensing object, as shown in FIG. 12. In the example shown in FIG. 12, a sensing area includes the road surface (including the centerline), the guardrail, and the scene, and the centerline, guardrail, and other vehicles are used as the monitoring object. Therefore, as shown in FIG. 12, the host system 2 determines a range of areas simultaneously including the road surface, the guardrail, and the preceding vehicle, as the specific area (monitoring area). In this example, the entire exposure area has the size of 640 pixels×480 pixels, and the start line number of the specific area and the scan area width are set to "280" and "75," respectively. That is, the range of areas corresponding to those pixel lines in the entire exposure area having line numbers 280 to 355 is determined as the specific area. With this arrangement, as shown in FIG. 12, the entire exposure area of the sensor cell array 56 corresponds to an entire scan area for the exposure of the normal exposure time, and the determined specific area corresponds to a specific scan area.

In the present embodiment, similar to those timings (1) to (5) shown in FIG. 10, the sampling time for the specific scan area corresponds to the time obtained by evenly dividing the normal exposure time into five separate times. In addition, the normal exposure time is set to a suitable time such that all photographic objects sensed in the entire exposure area can be sufficiently exposed to light. In this way, when the range of the specific area (start position and scan area width), the normal exposure time for the entire exposure area, and the sampling time for the specific area are determined, the host system 2 transmits this information to the image sensing apparatus 1 through the communicator/DSP operation control unit 12a.

Hereinafter, an operation for the case where the start position and scan area width of the specific area is not changed with the speed of the vehicle and the movement of the target object will be described.

When the image sensing apparatus 1 is powered on and the video image processing system 12 acquires information on the exposure time and information on the start line number and scan area width of the specific area from the host system 2, the communicator/DSP operation control unit 12a transmits a drive control signal for indicating the start line number and scan area width of the specific area to the image sensing processing system 10. Then, the timing controller 12b outputs, to the image sensing processing system 10, a drive signal (a pixel clock, a vertical sync signal, and a horizontal sync signal) for driving the image sensing element 100 to allow for obtaining the pixel signal for the entire exposure area having exposed with the normal exposure time.

When the image sensing processing system 10 receives the drive control signal, the scan line scanner 54 generates the reset line select signal and the readout line control signal for the entire exposure area in synchronization with the vertical sync signal and the horizontal sync signal. In addition, the readout line control signal for the specific area is generated on the basis of the start line number, the scan area width and the horizontal sync signal. These generated readout control signals are supplied to the OR logic 54e, and respective readout line select signals for the entire exposure area and the specific area are generated. These generated reset line select signal, two readout line select signals are output to the drive pulse generator 52. Then, the drive pulse generator 52 generates a drive pulse and supplies the drive pulse to the sensor cell array 56, on the basis of the reference timing signal from the reference timing generator and the various select signals from the scan line scanner 54.

The sensor cell array 56 scans the normal scan line L1 and the high-speed scan line L2 on the basis of the drive pulse from the drive pulse generator 52, reads out the charge accumulated by the exposure of the normal exposure time from respective pixel lines on the entire exposure area using the destructive readout mode (in this case, the accumulated charge is rest after the readout operation), and reads out the charge accumulated by the exposure of the plurality kinds of exposure times from respective pixel lines on the specific area using the non-destructive readout mode, independently from the destructive readout operation (in this case, the accumulated charge is not reset after the readout operation). The pixel signal composed of the charge read out at the time of scanning the normal scan line L1 is output to the first AFE 102 through the CH1 of the first horizontal transfer unit 58, and the pixel signal composed of the charge read out at the time of scanning the high-speed scan line L2 is output to the second AFE 104 through the CH2 of the second horizontal transfer unit 60.

The first AFE 102 converts the pixel signal (analog data) for the exposure of the normal exposure time, sequentially output through the CH1 into a digital pixel data and outputs the pixel data to the video image processing system 12. Meanwhile, the second AFE 104 converts the pixel signal (analog data) for the exposure of the plurality kinds of exposure times, sequentially output through the CH2 into a digital pixel data and outputs the pixel data to the video image processing system 12.

In the video image processing system 12, the pixel data for the entire exposure area supplied from the first AFE 102 is supplied to the normal image generation unit 12c, and the pixel data for the specific area supplied from the second AFE 104 is supplied to the high-speed/specific areal image generation unit 12*d*.

The normal image generation unit 12*c* acquires the normal scan image data through the first AFE 102, acquires corresponding address information for the acquired normal scan image data from the timing controller 12*b*, generates a normal image data obtained by correlating the address information with the normal scan image data, and memorizes the normal image data in the frame memory 14 through the memory access coordinator 12*f*.

Meanwhile, the high-speed/specific areal image generation unit 12*d* acquires the high-speed scan areal image data through the second AFE 104, acquires corresponding address information for the acquired high-speed scan areal image data (for the present frame of the specific area) from the timing controller 12*b*, and correlates the address information with high-speed scan areal image data. Moreover, the high-speed/specific areal image generation unit 12*d* acquires the specific area start position data from the system controller 2*a* through the communicator/DSP operation control unit 12*a*, determines, on the basis of the specific area start position data, whether the acquired high-speed specific areal image data is valid or invalid, and sets valid or invalid flag to the high-speed specific areal image data on the basis of the determination result. The high-speed specific areal image data having the address information and the valid or invalid flag correlated therewith is memorized in the frame memory 14 as a specific areal reference image data for use in generating the specific areal image data for the subsequent scan areal image data acquired in the subsequent scanning (i.e., in a frame subsequent to the present frame of the specific area). Hereinafter, the specific areal reference image data will be referred to as a subsequent reference image data.

The high-speed/specific areal image generation unit 12*d* acquires a specific areal reference image data (hereinafter, referred to as a previous reference image data) composed of the high-speed scan areal image data acquired at the time of the scanning (i.e., in a frame previous to the present frame of the specific area) immediately before that for the acquired high-speed/specific areal image data, from the frame memory 14 through the memory access coordinator 12*f*. Then, the high-speed/specific areal image generation unit 12*d* calculates a difference value between the pixel value of the respective pixel data constituting the acquired high-speed scan areal image data and the pixel value of corresponding respective pixel data in the acquired reference image data. Thereafter, the high-speed/specific areal image generation unit 12*d* generates a specific areal image data composed of the pixel value corresponding to the calculated difference value, outputs the specific areal image data to the control data generation unit 12*e*, and memorizes the specific areal image data in the frame memory 14 through memory access coordinator 12*f*. In this case, the valid or invalid flag set to the specific areal image data is also output to the control data generation unit 12*e*.

When the control data generation unit 12*e* acquires the specific areal image data (present specific areal image data) from the high-speed/specific areal image generation unit 12*d*, the first level conversion unit 80 converts the present specific areal image data into 4-bit data (16 gradation levels) and outputs the present specific areal image data having the 4-bit data format to the first LPF processing unit 82. Meanwhile, when the control data generation unit 12*e* acquires the specific areal image data (previous specific areal image data) for the frame previous to the frame of the present specific areal image data from the frame memory 14 through the memory access coordinator 12*f*, the second level conversion unit 81 converts the previous specific areal image data into 4-bit data and outputs the previous specific areal image data having the 4-bit data format to the second LPF processing unit 83. The first and second LPF processing units 82 and 83 perform a filtering process to the present and previous specific areal image data using the 2-dimensional LPF, and removes negligible changes in the image of the target object from the respective images for the present and previous specific areal image data. In the present embodiment, since the road surface is included in the specific area, those image portions such as stones on the road surface are removed.

The filtered present specific areal image data is output to the HPF processing unit 84 and the interframe difference calculation unit 85, and the filtered previous specific areal image data is output to the interframe difference calculation unit 85.

Upon receiving the filtered present specific areal image data, the HPF processing unit 84 performs a filtering process to the present specific areal image data using a 2-dimensional HPF and generates the first edge image data constituted by the edge portion of the present specific areal image data. In the present embodiment, since the specific area is set to the sensing area in the forward area of the vehicle, the first edge image data may include those edge images of objects within the specific area such as the guardrail, centerline, preceding vehicle. For example, when a target object having a shape as shown in FIG. 13A is sensed within the specific area, the first edge image may have a shape corresponding to the border line of the target object, as shown in FIG. 13B (in FIG. 13B, it is depicted by a dark colored area). The generated first edge image data is output to the target object detection unit 86.

Upon receiving the present specific areal image data and the previous specific areal image data respectively from the first LPF processing unit 82 and the second LPF processing unit 83, the interframe difference calculation unit 85 calculates a difference value between the respective pixel value of the present specific areal image data and the respective pixel value of the previous specific areal image data having the same pixel position as the respective pixel value of the present specific areal image data, and generates an interframe difference image data constituted by the difference value. The generated interframe difference image data is output to the target object detection unit 86.

Then, the interframe difference calculation unit 85 compares the calculated difference values with predetermined specific threshold value to count the total number of difference values equal to or greater than the specific threshold value. When the total number of difference values (pixels) equal to or greater than the threshold value is equal to or greater than a predetermined threshold value, the interframe difference calculation unit 85 determines that an abnormal situation has been occurred, generates an abnormality detection alarm signal, and outputs the generated abnormality detection alarm signal to the system controller 2*a*. That is, the abnormality detection alarm signal may be generated in cases where a new object has suddenly appeared in the image (i.e., the luminance level has abruptly changed) such as turning on of the preceding vehicle's brake lamp, a sudden appearance of obstacles (flying objects including other vehicles), or an abrupt change in the scene caused when the vehicle itself is about to get out of a tunnel.

Upon receiving the abnormality detection alarm signal from the image sensing apparatus 1, the system controller 2*a* determines that some object has suddenly appeared in a forward area of the vehicle itself or a glaring scene has suddenly appeared, controls the warning sound output device to output the warning sound and warning message through a speaker installed in the vehicle, or controls the braking system or steering system to perform a danger avoidance operation for preventing collision with the appeared object.

Meanwhile, upon receiving the present specific areal image data supplied from the first LPF processing unit 82, the first edge image data supplied from the HPF processing unit 84, and the interframe difference image data supplied from the interframe difference calculation unit 85, the target detection unit 86 generates the second edge image data from the interframe difference image data. The image of the second edge image data corresponds to the edge image composed of edge portions excluding those overlapping parts with the movement of the target object, as shown in FIG. 13C. The data for the edge image of the interframe difference image data as shown in FIG. 13C is compared with the data for the first edge image (of the present specific areal image) as shown in FIG. 13B, and these edge portions are connected to each other, thereby generating a final edge image data (detection image data). In addition, color information is extracted from the present specific areal image data. Then, the target object detection unit 86 estimates the position and shape of the target object on the basis of the generated detection image data and the extracted color information. Moreover, the target object detection unit 86 compares the size of the target object that can be known from the estimated shape of the target object with a predetermined specific threshold value, generates a first approach alarm signal when the size of the target object is equal to or greater than the specific threshold value, and outputs the first approach alarm signal to the system controller 2a. The generated detection image data (present detection image data) is output to the target object movement estimation unit 87 and memorized in the frame memory 14 through the memory access coordinator 12f.

Upon receiving the first approach alarm signal from the image sensing apparatus 1, the system controller 2a determines that the target object is approaching closer to the vehicle itself (the image sensing apparatus 1), controls the warning sound output device to output the warning sound and warning message through the speaker installed in the vehicle, or decelerates the speed of the vehicle (i.e., secures larger distance to the target object).

Upon receiving the present detection image data from the target object detection unit 86, the target object movement estimation unit 87 acquires the previous detection image data from the frame memory 14 through the memory access coordinator 12f. Then, the target object movement estimation unit 87 calculates a relative positional relation between the target objects in both present and previous detection images through a pattern matching technique on the basis of the present detection image data and the previous detection image data and estimates the movement of the target object on the basis of the positional relation. For example, when the amount of the positional change is greater than a specific threshold value, the target object movement estimation unit 87 generates a second approach alarm signal and outputs the second approach alarm signal to the system controller 2a.

Upon receiving the second approach alarm signal from the image sensing apparatus 1, the system controller 2a determines that the target object is rapidly approaching toward the vehicle itself (the image sensing apparatus 1), controls the warning sound output device to output the warning sound and warning message through the speaker installed in the vehicle, and controls the brake system and steering system to perform the danger avoidance operation.

The system controller 2a outputs various sync signals to the image sensing apparatus 1 and transmits a readout request of the normal image data.

The output reader 12g reads out, through the memory access coordinator 12f, the normal image data memorized in the frame memory 14 in synchronization with the various sync signals supplied from the system controller 2a, and outputs the readout normal image data to the system controller 2a. The system controller 2a acquires the normal image data supplied from the output reader 12g, and records the acquired normal image data to the recording apparatus 2c, or displays the normal image on the display apparatus 2b installed in the vehicle itself.

As described above, the image sensing apparatus 1 of the image sensing system 3 according to the present embodiment senses an image of a sensing object in a manner that in a single image sensing element, an image corresponding to an entire exposure area is sensed by exposing the entire exposure area to light with a normal exposure time using the destructive readout mode, and an image corresponding to a specific area is sensed by exposing the specific area to light with a plurality of kinds of exposure times using the non-destructive readout mode in the course of the exposure of the normal exposure time. Accordingly, it is possible to simultaneously acquire a normal image data for visibility as well as a high frame-rate (five times higher than that of the normal exposure) image data for control. Moreover, the image sensing apparatus 1 can estimate, from the high frame-rate image data, the position, shape, and movement of the target object, generate a control data on the basis of the estimation result, and output the control data to the host system 2. That is, it is possible to generate the control data immediately in response to an abrupt change or appearance of the target object and output the control data to the host system 2.

That is, since the image area (specific area) including the target object is sampled (sub-sampled) at a high speed, there is no great movement (change) in the sensing image even when the camera is moving at a high speed. Therefore, the amount of change (position of the object) in the sensing image is decreased and it is thus possible to easily extract an edge at the time of the interframe difference calculation (because the width of the edge is decreased). Accordingly, when the image sensing system of the invention is mounted on a mobile object, it is possible to generate a control data suitable for the high-speed control of the mobile object. For example, when the mobile object is moving at 100 km/hr (about 28 m/sec) and the image sensing apparatus 1 is sampling the specific area at a sampling interval of about 33 ms (i.e. $\frac{1}{30}$ sec), the traveling distance of the mobile object during the sampling interval corresponds to about 90 cm. In this case, when the sampling rate is increased 10 times, the traveling distance of the mobile object would be about 9 cm. Therefore, it is possible to decrease the amount of change (position of the object) in the sensing image and thus easily extract an edge at the time of the interframe difference calculation (because the width of the edge is decreased).

In this way, by utilizing the image data acquired through the high-speed sampling, it is possible to detect the target object at a high speed. Since immediate responsiveness is crucial to the danger avoidance of a mobile object moving at a high speed, it is extremely important to detect the status of the target object immediately. For example, when images are acquired at an interval of $\frac{1}{30}$ second (equivalent to the response speed of existing cameras or human eyes) and the detection of the target object requires $\frac{1}{100}$ second, the image acquisition time serves as a ruling factor. In this case, the mobile object may have advanced about 1 meter in the meantime. Meanwhile, when the sampling rate is increased 10 times to acquire images at an interval of $\frac{1}{300}$ second and the detection requires $\frac{1}{100}$ second; it only takes about $\frac{4}{300}$ second for detecting the target object after the image acquisition. In this case, the mobile object may have advanced about 30 cm in the meantime. In other words, when normalized in the frame rate, speeding-up of processing about 10 times may be thought to be equal to speeding-down of the vehicle speed about 1/10 times. That is, the 100 km/hr speed of the mobile object may be translated into a speed of 10 km/hr. Accordingly, it is possible to increase the chance of avoiding danger by employing the image sensing system 3 of the present embodiment.

Moreover, the present embodiment is configured to record the normal image data to the recording apparatus 2c. Therefore, in the case of an accident such as a car crash, as long as it can record the corresponding normal image data for the accident, it is possible to reproduce a sensing image (video image) for the normal image data with visibility of the situation at the time of the accident. In this case, the video image may be used as analysis data or evidence for the accident.

In the above-described embodiment, the operations of reading out charge from the entire exposure area of the sensor cell array 56 for the normal exposure time using the destructive readout mode, by means of the reference timing generator 50, the scan line scanner 54, the drive pulse generator 52, and the first horizontal transfer unit 58, in the individual area scannable image sensing element 100 of the image sensing processing system 10 correspond to the first readout unit according to any one of Aspects 1, 2, 3, and 14, or the first readout step according to Aspect 15. Moreover, the operations of reading out charge from the specific area of the sensor cell array 56 for the plurality kinds of exposure times using the non-destructive readout mode, by means of the reference timing generator 50, the scan line scanner 54, the drive pulse generator 52, and the second horizontal transfer unit 60, in the individual area scannable image sensing element 100 of the image sensing processing system 10 correspond to the second readout unit according to any one of Aspects 1, 2, 3, 12, and 14, or the second readout step according to Aspect 15.

In the above-described embodiment, the sensor cell array 56 corresponds to the photoelectric conversion unit according to any one of Aspects 1, 2, 3, 14, and 15; the normal image generation unit 12c corresponds to the image data generation unit according to any one of Aspects 1, 2, 3, and 14, or the image data generation step according to Aspect 15; the high-speed/specific areal image generation unit 12d and the control data generation unit 12e correspond to the control data generation unit according to any one of Aspects 1 to 9, 11, 13, and 14, or the control data generation step according to Aspect 15.

Hereinabove, the operation for the case where the start position and scan area width of the specific area is not changed with the speed of the vehicle and the movement of the target object has been described. Hereinafter, an operation for the case where the start position and scan area width of the specific area is changed will be described as a modified example of the above-described embodiment.

First, the case where the range of the specific area is changed on the basis of the speed information of the vehicle itself will be described. In this case, the system controller 2a of the host system 2 acquires the speed information of the vehicle itself and compares the acquired speed information with predetermined two kinds of speed threshold values. Specifically, the acquired speed information is compared with a predetermined first threshold value (for example, 40 km/hr) for low-speed and a predetermined second threshold value (for example, 80 km/hr) for high-speed. When the speed as indicated by the speed information is in the range (for example, between 40 to 80 km/hr) of the first threshold value and the second threshold value, the scan area width of the specific area is set to a normal width (for example, 75 lines). When the comparison result shows that the speed as indicated by the speed information is smaller than the first threshold value, the width of the specific area is set to a width (for example, 100 lines) wider than the normal width. That is, when the vehicle itself is moving at a low speed, it is possible to speed down the responding to avoid dangers to that extent. Accordingly, it is possible to provide an increased level of monitoring and security with respect to the monitoring object by widening the range of the specific area (monitoring area).

When the speed as indicated by the speed information is greater than the second threshold value, the width of the specific area is set to a width (for example, 50 lines) narrower than the normal width. That is, when the vehicle itself is moving at a high speed, it is necessary to speed up the responding to avoid dangers to that extent. Accordingly, it is possible to increase the data acquisition speed by narrowing the range of the specific area (monitoring area) and thus increasing the frame rate (speed up the sampling), thereby improving security level related to the high-speed responding.

Specifically, the operation of changing the scan area width of the specific area is performed in a manner that the start line number and scan area width corresponding to the changed width are determined by the system controller 2a and output to the image sensing apparatus 1 through the communicator/DSP operation control unit 12a. Then, the image sensing apparatus 1 outputs information on the acquired start line number and scan area width to the image sensing processing system 10, and the scan line scanner 54 generates the readout line select signal for the specific area, on the basis of the start line number, the scan area width, and the horizontal sync signal, similar to those described above.

Next, the case where the start position of the specific area is changed on the basis of the position and shape information of the target object supplied from the image sensing apparatus 1 will be described. In this case, the system controller 2a of the host system 2 acquires the position and shape information of the target object from the control data generation unit 12e of the image sensing apparatus 1, and determines, on the basis of the acquired information and presently set information on the start position and scan area width of the specific area, whether the target object is included within the specific area. When it is determined that the target object is beyond the specific area, the system controller 2a determines the start position of the specific area so that the target object is included within the specific area, and outputs the start line number information corresponding to the determined start position to the image sensing apparatus 1 through the communicator/DSP operation control unit 12a. Then, the image sensing apparatus 1 outputs information on the acquired start line number to the image sensing processing system 10, and the scan line scanner 54 generates the readout line select signal for the specific area, on the basis of the start line number, the scan area width, and the horizontal sync signal, similar to those described above. As described above, in the image sensing apparatus 1, it is possible to detect the position of the target object in the specific area on the basis of the position and shape information of the target object and change (i.e., keep track of the target object) the position of the specific area so as to keep track of the positional change. With this arrangement, it is possible to monitor the monitoring object accurately.

Meanwhile, when it is configured to change the start position and scan area width of the specific area, the exposure time may change with the scan area width. That is, the exposure time for the specific area may differ before and after changing the start position and scan area width of the specific area and thus pixel data having different exposure times may coexist in the same frame. In the image sensing system of the invention, the system controller 2a is configured to output, to the control data generation unit 12e of the image sensing apparatus 1, the specific area start position data for indicating whether the start position and scan area width of the specific area is changed. Upon acquiring the specific area start position data, the image sensing apparatus 1 determines whether the specific area start position data is changed, and sets an invalid flag to the specific areal image data generated from the high-speed specific areal image data for the present frame when it is determined that the specific area start position data is changed. In this way, the specific areal image data having the invalid flag set thereto is not used in the later processing in the control data generation unit 12e. Accordingly, it is possible to estimate the position and shape of the target object more accurately and generate more accurate control data.

In the modified example of the above-described embodiment, the operations of the image sensing processing system 10 for changing the width of the specific area on the basis of the start line number and scan area width determined on the basis of the speed information of the mobile object correspond to the specific area width setting unit according to Aspect 12.

In the modified example of the above-described embodiment, the operations of the image sensing processing system 10 for changing the position of the specific area on the basis of the start line number and scan area width determined on the basis of the position and shape information of the target object correspond to the position changing unit according to Aspect 13.

The above-described embodiments have been described with reference to the case where the image sensing apparatus 1 is mounted on the mobile object and controls various devices mounted on the mobile object as the control object. However, the invention is not limited to this but the image sensing apparatus 1 may be mounted on objects other than the mobile object.

In the above-described embodiments, the image sensing apparatus 1 is configured to estimate the position, shape, or movement of the target object, generate various alarm signals (the control data) on the basis of the estimation result, and output the signals to the host system 2. However, the invention is not limited to this but may be configured such that the image data itself read out from the specific area is output as the control data to the host system 2, the estimation operation is performed by the host system 2, and the information estimated from the target object is not restricted to the position, shape, and movement of the target object.

In the above-described embodiments, the image sensing processing system 10, the video image processing system 12, and the frame memory 14 are configured to be included in the same device. However, the invention is not limited to this but may be configured such that the image sensing processing system 10, the video image processing system 12, and the frame memory 14 are configured as an individual device, and they may be communicably connected to each other via a communication network (this arrangement corresponds to the image sensing system according to Aspect 12). With this arrangement, it is possible to separate the image sensing processing system from the video image processing system (including the frame memory). For example, by configuring such that a plurality of devices of the image sensing processing system and a single device of the video image processing system are communicably connected to each other via Internet, and the sensing data obtained from the plurality of devices of the image sensing processing system is processed by the single device of the video image processing system remotely disposed from the plurality of devices of the image sensing processing system, it is possible to collectively manage the sensing data.

The above-described embodiments have been described with reference to the case where one specific scan area (the specific area) is selected from the entire scan area (the entire exposure area). However, the invention is not limited to this but two or more specific scan areas may be selected from the entire scan area as long as a normal non-destructive charge readout operation can be performed within the selected scan areas.

In the above-described embodiments, the entire exposure area was subjected to the destructive readout process, a portion of the entire exposure area is selected as the specific area, and the specific area is subjected to the non-destructive readout process. However, the invention is not limited to this but may be configured such that a portion of the entire exposure area is selected as an area A, the area A is subjected to the destructive readout process, a portion of the area A is selected as an area B (the specific area), and the area B is subjected to the non-destructive readout process.

The entire disclosure of Japanese Patent Application Nos: 2006-084931, filed Mar. 27, 2006 and 2007-014722, filed Jan. 25, 2007 are expressly incorporated by reference herein.

What is claimed is:

1. An image sensing apparatus including a photoelectric conversion unit constituted by a plurality of photoelectric conversion elements converting exposed light into charge and accumulating the charge therein, the photoelectric conversion elements being arranged in a matrix, and an electronic shutter function for controlling an exposure time for each frame, the apparatus comprising:

a first readout unit that reads out charge from pixels composed of the photoelectric conversion elements corresponding to an entire exposure area of the photoelectric conversion unit using a destructive readout mode, the charge being accumulated in the pixels as a result of exposure for a predetermined exposure time, the entire exposure area being an entire area of the photoelectric conversion unit to which light can be exposed, the destructive readout mode being configured such that a reset operation for clearing the charge accumulated in the pixels is performed after the charge is read out from the pixels;

a second readout unit that reads out charge from pixels composed of the photoelectric conversion elements corresponding to a specific area in the entire exposure area of the photoelectric conversion unit using a non-destructive readout mode, in a period when the first readout unit is reading out charge from the entire exposure area, the charge read out by the second readout unit being the charge accumulated in the pixels composed of the photoelectric conversion elements corresponding to the specific area, the non-destructive readout mode being configured such that the charge accumulated in the pixels is maintained after the charge is read out from the pixels;

an image data generation unit that generates an image data on the basis of a first pixel data composed of the charge read out by the first readout unit, the charge being obtained by exposing the entire exposure area to light for the predetermined exposure time;

a control data generation unit that generates a control data for use in controlling a predetermined control object on the basis of a second pixel data composed of the charge read out by the second readout unit, the charge being obtained by exposing the specific area to light with a plurality kinds of exposure times; and a control data output unit that outputs the control data generated by the control data generation unit.

2. The image sensing apparatus according to claim 1, wherein the control data generation unit includes a first difference value calculation unit for calculating, for each frame, a first difference value that is a difference between respective pixel values for two of the second pixel data having the same pixel position and different exposure time, among the second pixel data having the plurality kinds of exposure times and obtained through the plurality times of readout operations, and generates the control data on the basis of the first difference value calculated by the first difference value calculation unit.

3. The image sensing apparatus according to claim 2, wherein the control data generation unit includes:

a present specific areal image data generation unit for generating a present specific areal image data on the basis of the first difference value for a present frame calculated by the first difference value calculation unit;

a previous specific areal image data generation unit for generating a previous specific areal image data on the basis of the first difference value for a previous frame calculated by the first difference value calculation unit, the previous frame being previous to the frame of the present specific areal image data; and a second difference value calculation unit for calculating a second difference value that is a difference between the respective pixel values for the pixel data of the present specific areal image data and the pixel data of the previous specific areal image data, and wherein the control data generation unit generates the control data on the basis of the second difference value calculated by the second difference value calculation unit.

4. The image sensing apparatus according to claim 3, wherein the control data generation unit includes a filter processing unit for performing a filtering process to the present specific areal image data and the previous specific areal image data using a 2-dimensional low-pass filter, and wherein the control data generation unit calculates, as the second difference data, a difference value between the respective pixel values for the pixel data of the present specific areal image data and the pixel data of the previous specific areal image data which have been subjected to the filtering process by the second difference value calculation unit, and generates the control data on the basis of the second difference value calculated by the second difference value calculation unit.

5. The image sensing apparatus according to claim 3, wherein the control data generation unit generates data for notifying a control unit of the predetermined control object of a fact that the number of pixels having a luminance value equal to or greater than a specific value as indicated by the second difference value has reached a predetermined number or more.

6. The image sensing apparatus according to claim 2, wherein the control data generation unit includes an estimation unit for estimating information on a predetermined photographic object sensed from the specific area on the basis of the second pixel data having the plurality kinds of exposure times, and generates the control data on the basis of the estimation result in the estimation unit.

7. The image sensing apparatus according to claim 6, wherein the control data generation unit includes an edge information extraction unit for extracting edge information from a difference image data in which the first difference value is composed of pixel data corresponding to respective pixels of the specific area, and wherein the estimation unit estimates the shape of the predetermined photographic object on the basis of the edge information extracted by the edge information extraction unit.

8. The image sensing apparatus according to claim 7, wherein the control data generation unit generates data for notifying a control unit of the predetermined control object of a fact that the amount of change in the shape of the predetermined photographic object as indicated by the shape estimation result of the photographic object has reached a value equal to or greater than a predetermined value or less than the predetermined value.

9. The image sensing apparatus according to claim 6, wherein the edge information extraction unit extracts edge information from the image data as well as a difference image data in which the first difference value is composed of pixel data corresponding to respective pixels of the specific area, and wherein the estimation unit estimates the shape of the predetermined photographic object on the basis of the edge information extracted by the edge information extraction unit.

10. An image sensing apparatus including a photoelectric conversion unit constituted by a plurality of photoelectric conversion elements converting exposed light into charge and accumulating the charge therein, and an exposure time control function for controlling an exposure time of the photoelectric conversion elements, the apparatus comprising:

a first readout unit that reads out charge from pixels composed of the photoelectric conversion elements of the photoelectric conversion unit, the charge being accumulated in the pixels as a result of exposure for a predetermined exposure time;

a second readout unit that reads out charge from pixels of a specific area in a predetermined area of the photoelectric conversion unit over a plurality of times, in a period when the first readout unit is reading out charge from the pixels of the predetermined area of the photoelectric conversion unit;

an image data generation unit that generates an image data on the basis of a first pixel data composed of the charge read out by the first readout unit;

a predetermined data generation unit that generates a predetermined data on the basis of a second pixel data composed of the charge read over the plurality of times by the second readout unit; and a specific area width setting unit for setting the width of the specific area on the basis of speed information of a mobile object on which the image sensing apparatus is mounted.

11. An image sensing apparatus including a photoelectric conversion unit constituted by a plurality of photoelectric conversion elements converting exposed light into charge and accumulating the charge therein, and an exposure time control function for controlling an exposure time of the photoelectric conversion elements, the apparatus comprising:

a first readout unit that reads out charge from pixels composed of the photoelectric conversion elements of the photoelectric conversion unit, the charge being accumulated in the pixels as a result of exposure for a predetermined exposure time;

a second readout unit that reads out charge from pixels of a specific area in a predetermined area of the photoelectric conversion unit over a plurality of times, in a period when the first readout unit is reading out charge from the pixels of the predetermined area of the photoelectric conversion unit;

an image data generation unit that generates an image data on the basis of a first pixel data composed of the charge read out by the first readout unit; and a predetermined data generation unit that generates a predetermined data on the basis of a second pixel data composed of the charge read over the plurality of times by the second readout unit, wherein the control data generation unit is configured to estimate the position of the predetermined photographic object in the exposure area on the basis of the second pixel data having the plurality kinds of exposure times, and wherein the control data generation unit includes a position change unit for changing the position of the specific area on the basis of the estimated position.

* * * * *